(12) United States Patent
Yamada et al.

(10) Patent No.: US 11,073,342 B2
(45) Date of Patent: Jul. 27, 2021

(54) REGENERATIVE HEAT EXCHANGER

(71) Applicant: DENSO CORPORATION, Kariya (JP)

(72) Inventors: Atsushi Yamada, Kariya (JP); Shin Nishida, Kariya (JP); Takayuki Ota, Kariya (JP); Takashi Danjo, Kariya (JP)

(73) Assignee: DENSO CORPORATION, Kariya (JP)

( * ) Notice: Subject to any disclaimer, the term of this patent is extended or adjusted under 35 U.S.C. 154(b) by 321 days.

(21) Appl. No.: 16/305,144

(22) PCT Filed: May 10, 2017

(86) PCT No.: PCT/JP2017/017741
§ 371 (c)(1),
(2) Date: Nov. 28, 2018

(87) PCT Pub. No.: WO2017/208760
PCT Pub. Date: Dec. 7, 2017

(65) Prior Publication Data
US 2020/0318915 A1 Oct. 8, 2020

(30) Foreign Application Priority Data
Jun. 1, 2016 (JP) .............................. JP2016-110304

(51) Int. Cl.
*F28D 20/02* (2006.01)
*F28F 1/32* (2006.01)
(Continued)

(52) U.S. Cl.
CPC .............. *F28D 20/02* (2013.01); *F28F 1/128* (2013.01); *F28F 1/32* (2013.01); *F28D 2020/0008* (2013.01); *F28D 2020/0013* (2013.01)

(58) Field of Classification Search
CPC ............. F28D 20/02; F28D 2020/0013; F28D 2020/0008; F28F 1/128; F28F 1/132; F25B 39/02; B60H 1/32
See application file for complete search history.

(56) References Cited

U.S. PATENT DOCUMENTS 2,055,549 A * 9/1936 Modine ...................... F28F 1/32
165/146
6,209,628 B1 * 4/2001 Sugimoto ............. F28D 1/0435
165/135
(Continued)

FOREIGN PATENT DOCUMENTS

JP 2009121759 A 6/2009
JP 2010091250 A 4/2010
(Continued)

*Primary Examiner* — Devon Russell
(74) *Attorney, Agent, or Firm* — Harness, Dickey & Pierce, P.L.C.

(57) ABSTRACT

A regenerative heat exchanger includes a refrigerant pipe, a regenerator, and an air passage fin. The air passage fin is disposed in an air passage defined outside of the refrigerant pipe and the regenerator, and is thermally connected with the regenerator directly or through the refrigerant pipe. At least one of the regenerator and the air passage fin is configured such that a thermal resistance between a part of a regenerative material located on an upstream side and air flowing through the air passage becomes larger than a thermal resistance between a part of the regenerative material located on a downstream side and air flowing through the air passage.

16 Claims, 28 Drawing Sheets

(51) Int. Cl.
  *F28F 1/12* (2006.01)
  *F28D 20/00* (2006.01)

(56) References Cited

U.S. PATENT DOCUMENTS

| | | | | |
|---|---|---|---|---|
| 9,915,481 | B2* | 3/2018 | Nakamura | F28D 1/05383 |
| 2004/0104020 | A1* | 6/2004 | Haller | F28D 7/0008 |
| | | | | 165/177 |
| 2010/0050685 | A1* | 3/2010 | Yanik | F25B 39/00 |
| | | | | 62/515 |
| 2010/0065244 | A1* | 3/2010 | Yokoyama | B60H 1/005 |
| | | | | 165/10 |
| 2010/0223949 | A1* | 9/2010 | Higashiyama | F28D 1/05391 |
| | | | | 62/519 |
| 2010/0243226 | A1* | 9/2010 | Huazhao | F28F 1/128 |
| | | | | 165/182 |
| 2010/0307180 | A1* | 12/2010 | Yamada | F28F 1/10 |
| | | | | 62/285 |
| 2011/0239696 | A1 | 10/2011 | Takagi | |
| 2012/0042687 | A1* | 2/2012 | Kamoshida | F28D 20/02 |
| | | | | 62/524 |
| 2012/0204597 | A1* | 8/2012 | Karl | F28F 3/025 |
| | | | | 62/529 |
| 2013/0047663 | A1* | 2/2013 | Kamoshida | F25B 39/02 |
| | | | | 62/524 |
| 2014/0318176 | A1 | 10/2014 | Takagi | |
| 2015/0068718 | A1* | 3/2015 | Ota | F28F 1/40 |
| | | | | 165/181 |
| 2015/0168047 | A1* | 6/2015 | Danjyo | F25B 39/022 |
| | | | | 62/467 |
| 2015/0211806 | A1* | 7/2015 | Ota | F28D 1/05366 |
| | | | | 165/10 |
| 2015/0226494 | A1 | 8/2015 | Tomita et al. | |
| 2015/0226495 | A1* | 8/2015 | Park | F28F 1/128 |
| | | | | 165/151 |

FOREIGN PATENT DOCUMENTS

| | | |
|---|---|---|
| JP | 2010149814 A | 7/2010 |
| JP | 2010203748 A | 9/2010 |
| JP | 2013256262 A | 12/2013 |
| JP | 2015124940 A | 7/2015 |
| WO | WO-2013186983 A1 | 12/2013 |
| WO | WO-2015029288 A1 | 3/2015 |

* cited by examiner

REGENERATIVE HEAT EXCHANGER

CROSS REFERENCE TO RELATED APPLICATIONS

This application is a U.S. National Phase Application under 35 U.S.C. 371 of International Application No. PCT/JP2017/017741 filed on May 10, 2017. This application is based on and claims the benefit of priority from Japanese Patent Application No. 2016-110304 filed on Jun. 1, 2016. The entire disclosures of all of the above applications are incorporated herein by reference.

TECHNICAL FIELD

The present disclosure relates to a regenerative heat exchanger for a refrigerating cycle device.

BACKGROUND ART

In recent years, the number of idling-stop vehicles is increased, in which the engine is automatically suspended during a stop of the vehicle. A refrigerating cycle device mounted in this kind of vehicle performs a cooling operation for the vehicle cabin using a regenerative material of a regenerative heat exchanger, when circulation of refrigerant is stopped by the stop of the engine at the idling-stop time. In such a refrigerating cycle device, a temperature of air blown off to the vehicle cabin through the regenerative heat exchanger (henceforth "blow-off air temperature") should be lower than or equal to a permissive temperature, by which an occupant of the vehicle can feel low temperature at the idling-stop time as long as possible. Patent Literature 1 describes that the blow-off air temperature by which an occupant of the vehicle can feel low temperature is 15-17° C. or less.

PRIOR ART LITERATURES

Patent Literature

Patent Literature 1: JP 2013-256262 A

SUMMARY OF INVENTION

According to a result of research conducted by the inventors, in case where a regenerative material with the melting point of 3-10° C. is used for a regenerative heat exchanger, after an idling stop is started, the regenerative material starts melting when the blow-off air temperature exceeds the melting point of the regenerative material, and the regenerative material has melted at an early stage. If the regenerative material has melted at an early stage from the start of idling stop, the time period during which the blow-off air temperature is maintained to be lower than or equal to the permissive temperature will be short to affect the feeling of the occupant.

It is an object of the present disclosure to provide a regenerative heat exchanger by which a low temperature feeling can be kept for long time for an occupant at the idling stop time.

According to an aspect of the present disclosure, a regenerative heat exchanger includes a refrigerant pipe having a refrigerant passage through which refrigerant flows, a regenerator having a regenerative material that stores cold heat of the refrigerant by exchanging heat with the refrigerant flowing through the refrigerant pipe, and a regenerative material case housing the regenerative material, and an air passage fin disposed in an air passage defined outside of the refrigerant pipe and the regenerator, the air passage fin being thermally connected with the regenerator directly or through the refrigerant pipe.

At least one of the regenerator and the air passage fin is configured such that a thermal resistance between a part of the regenerative material located on an upstream side in the air flow direction of the air passage and air flowing through the air passage becomes larger than a thermal resistance between a part of the regenerative material located on a downstream side in the air flow direction of the air passage and air flowing through the air passage.

In the following explanation, the upstream side represents an upstream side in the air flow direction of the air passage, and the downstream side represents a downstream side in the air flow direction of the air passage.

Thus, for example when the flow of the refrigerant is stopped in the refrigerant pipe by a stop in the engine, heat of air flowing through the air passage moves to the regenerative material through the air passage fin and the regenerative material case. At this time, the temperature of air on the upstream side is higher than the temperature of air on the downstream side. Then, in this regenerative heat exchanger, at least one of the regenerator and the air passage fin is configured so that the thermal resistance between the regenerative material located on the upstream side and the air flowing through the air passage becomes larger than the thermal resistance between the regenerative material located on the downstream side and the air flowing through the air passage. Thereby, the melting timing of the regenerative material located on the upstream side becomes late and becomes close to a melting timing of the regenerative material located on the downstream side, such that the regenerative material starts melting at the same time on the whole. Therefore, according to the regenerative heat exchanger, compared with a conventional regenerative heat exchanger, a finish timing of the melting of the regenerative material located on the upstream side and a finish timing of the melting of the regenerative material located on the downstream side can be made late. Therefore, the regenerative heat exchanger can lengthen the time period during which the blow-off air temperature is maintained to a temperature by which an occupant can feel low temperature at an idling stop time.

DESCRIPTION OF EMBODIMENTS

Figure 1:
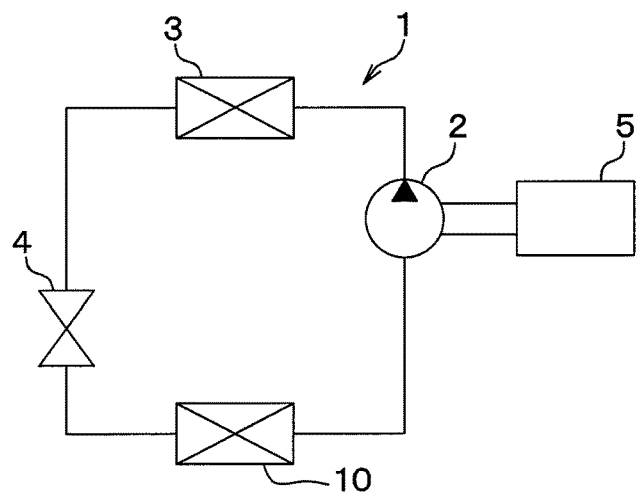
FIG. 1 is a block diagram illustrating a refrigerating cycle device according to a first embodiment.

Hereinafter, embodiments will be described according to the drawings. Same or equivalent portions among respective embodiments below are labeled with same reference numerals in the drawings.

First Embodiment

A first embodiment is explained by referring to the drawings. A regenerative heat exchanger of this embodiment is used for a refrigerating cycle device of an air-conditioner for a vehicle.

<Configuration of Refrigerating Cycle Device>

A configuration of the refrigerating cycle device is explained. As shown in FIG. 1, the refrigerating cycle device 1 includes a compressor 2, a condenser 3, an expansion valve 4, and an evaporator 10 as a regenerative heat exchanger. These components are annularly connected by piping to define a circulation way of refrigerant.

The compressor 2 draws and compresses refrigerant from the evaporator 10. The compressor 2 is driven by power transmitted from an engine 5 of a vehicle. Alternatively, an electric motor may be a source of power driving the compressor 2.

The high-pressure gas phase refrigerant output from the compressor 2 flows into the condenser 3. The high-pressure gas phase refrigerant which flowed into the condenser 3 is condensed by being cooled by heat exchange with outside air, when flowing through a refrigerant channel of the condenser 3. The condenser 3 may also be called as radiator which emits heat of gas phase refrigerant to outside air.

The liquid phase refrigerant condensed with the condenser 3 is decompressed, when passing the expansion valve 4, and is made in gas-and-liquid two-phase state. The expansion valve 4 may be a fixed throttle such as orifice or nozzle, or a proper adjustable diaphragm.

The decompressed low-pressure refrigerant flows into the evaporator 10. The evaporator 10 is arranged in an air-conditioning case which is not illustrated. The low-pressure refrigerant which flows through the refrigerant passage in the evaporator 10 evaporates by absorbing heat from air sent by an air-conditioning blower which is not illustrated. The evaporator 10 cools air which flows through the air-conditioning case due to the evaporation latent heat of low-pressure refrigerant. The temperature of air is controlled by a heater core which is not illustrated, and the air is blown off to the vehicle cabin. The refrigerant passing through the evaporator 10 is drawn by the compressor 2 through an accumulator which is not illustrated.

When the engine 5 stops, as the source of power driving the compressor 2, the drive of the compressor 2 stops, and the flow of the refrigerant stops in the refrigerating cycle device 1.

<Configuration of Evaporator 10>

The configuration of the evaporator 10 as a regenerative heat exchanger is explained.

Figure 2:
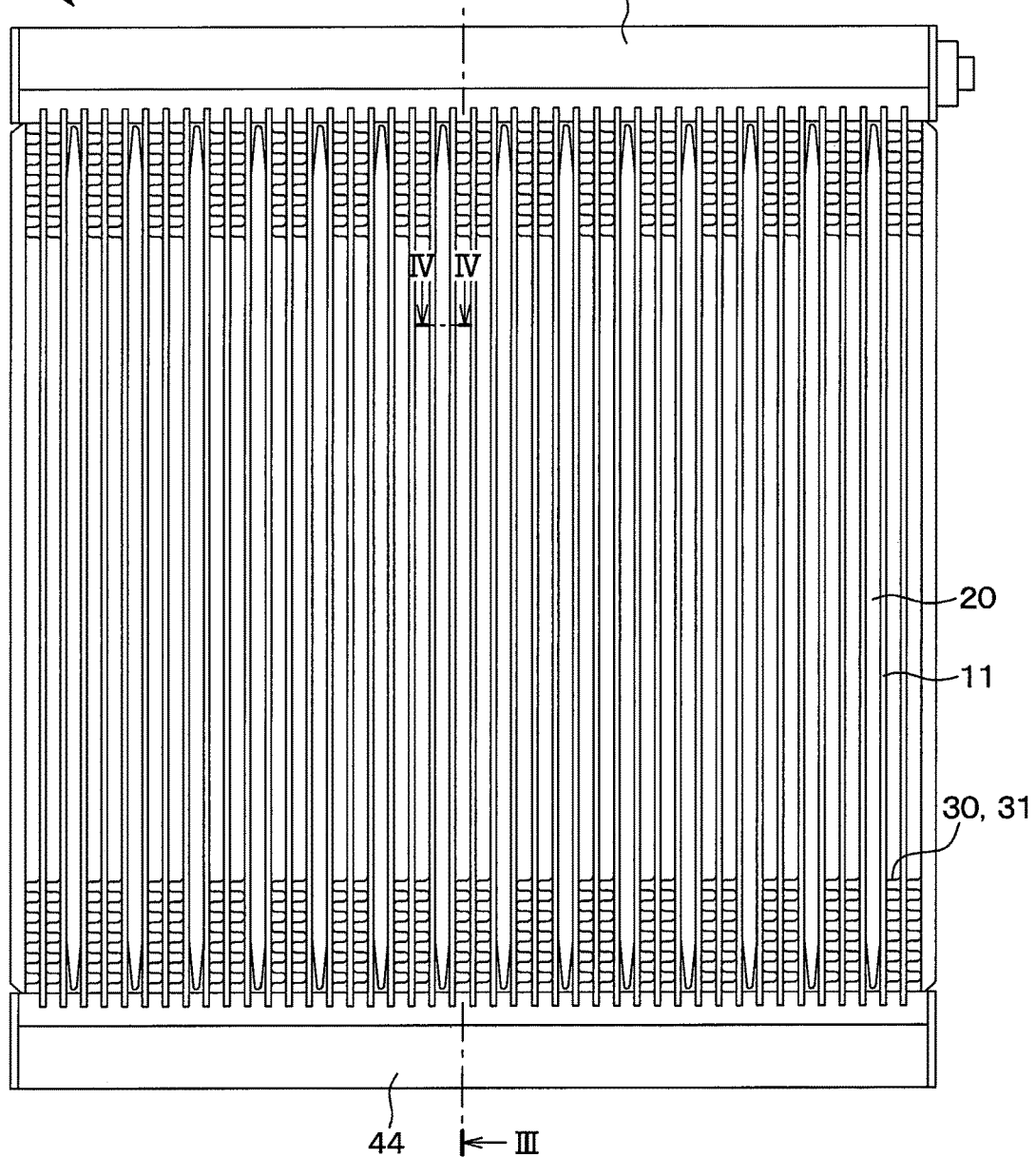
FIG. 2 is a plan view of an evaporator of the first embodiment.
Figure 3:
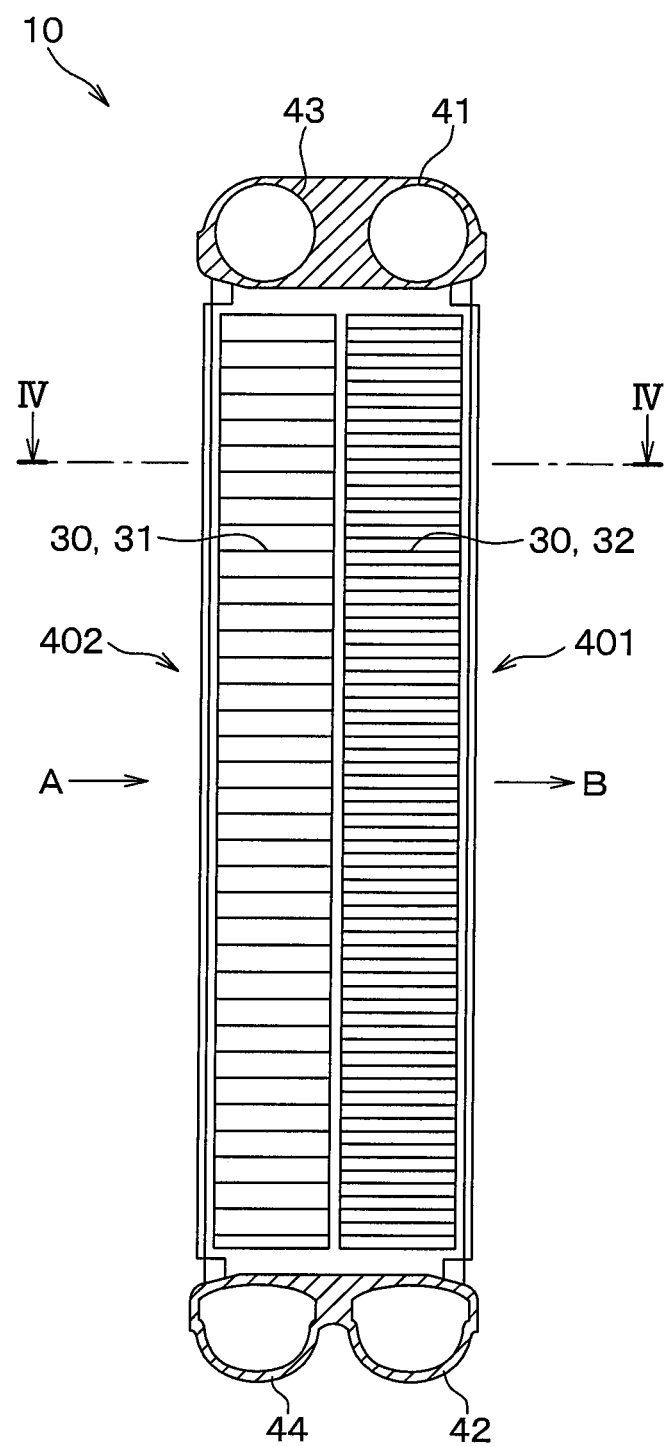
FIG. 3 is a cross-sectional view taken along a line III-III of FIG. 2.
Figure 4:
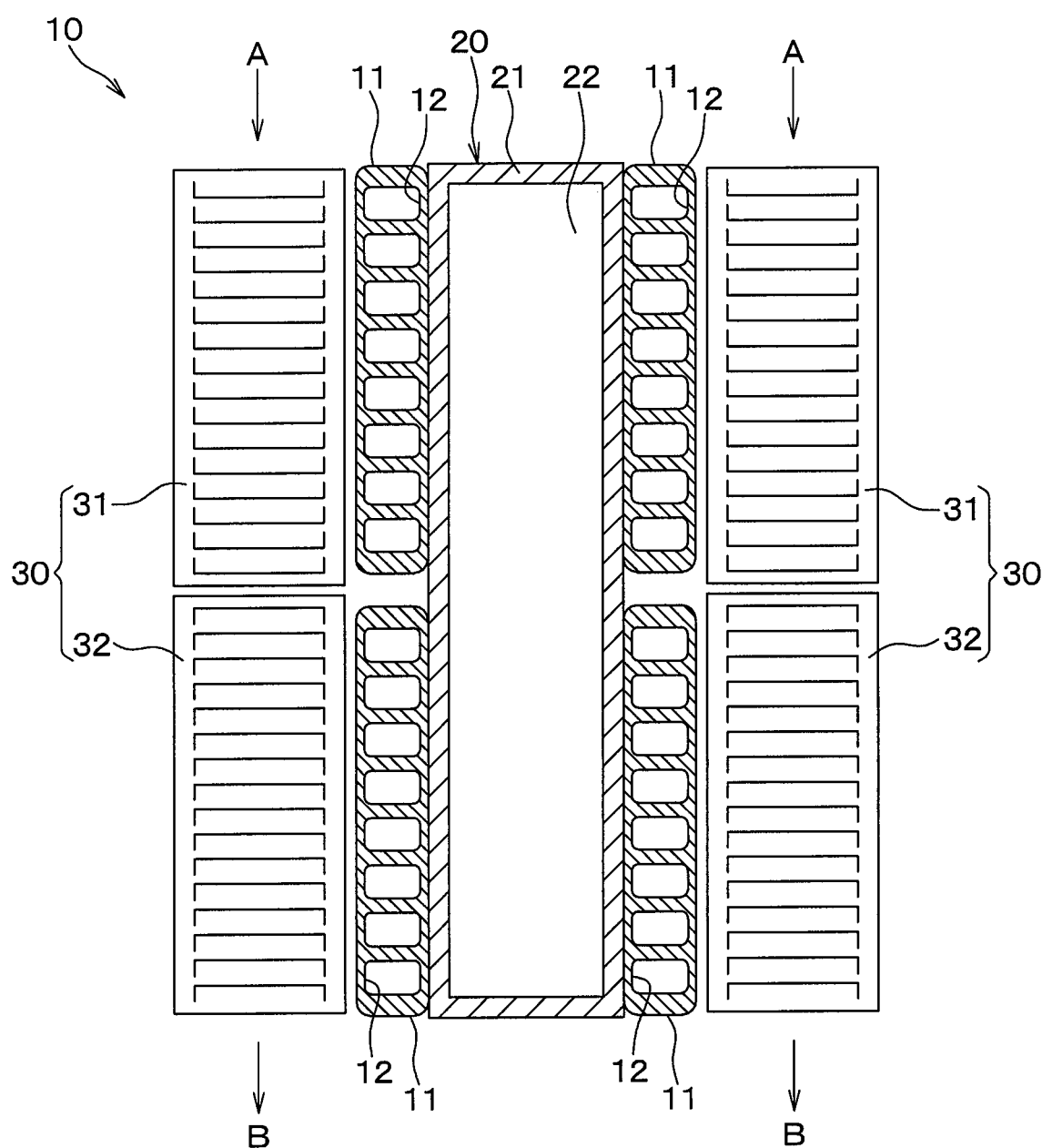
FIG. 4 is a partial cross-sectional view taken along a line IV-IV of FIG. 2.

As shown in FIG. 2 to FIG. 4, the evaporator 10 includes plural refrigerant pipes 11, plural regenerators 20, plural air passage fins 30 and first to fourth header tanks 41-44. In FIG. 2, illustration of the air passage fin 30 is partially omitted.

The arrows A and B shown in FIG. 3 and FIG. 4 represent the flow direction of air in the air passage of the evaporator 10. In the following explanation, the flow direction of air in the air passage of the evaporator 10 may be called as an air flow direction. In FIG. 2, air flows from the front side to the back side in the sheet of FIG. 2.

As shown in FIG. 2, the plural refrigerant pipes 11 are arranged with a predetermined interval in a direction intersecting the air flow direction. The refrigerant pipes 11 extend straightly from one end to the other end. The refrigerant passage 12 (refer to FIG. 4) defined inside of the refrigerant pipe 11 also extends straightly from one end to the other end. The refrigerant pipe 11 is made of metal such as aluminum.

A clearance is formed between the refrigerant pipes 11 adjacent to each other in the evaporator 10. Among the clearances, a clearance in which the air passage fin 30 is arranged is an air passage. Moreover, among the clearances, instead of the air passage fin 30, a regenerator 20 is arranged in a predetermined clearance. The arrangement of the air passage fin 30 and regenerator 20 can be set up arbitrarily.

FIG. 4 illustrates, of the regenerators 20 shown in FIG. 2, only the refrigerant pipes 11 formed on the both sides of one regenerator 20 and the air passage fins 30 located opposite from the regenerator 20 through the respective refrigerant pipe 11. As shown in FIG. 4, the refrigerant pipes 11 are arranged to overlap on the upstream side and the downstream side along the air flow direction.

The refrigerant pipe 11 is a multi-hole pipe with plural refrigerant passages 12 inside and is formed in flat in the cross section. Refrigerant flows through the plural refrigerant passages 12. The refrigerant passages 12 are communicated with the first to fourth header tanks 41-44, respectively, to which one end and the other end of the refrigerant pipe 11 are connected.

The first to fourth header tanks 41-44 distribute refrigerant to the refrigerant pipes 11, or gather refrigerant flowing out of the refrigerant pipes 11. The first to fourth header tanks 41-44 are made of metal such as aluminum.

A configuration example of the first to fourth header tanks 41-44 and the refrigerant pipes 11 is explained.

As shown in FIG. 3, the first header tank 41 and the second header tank 42 are arranged parallel at a predetermined distance. The refrigerant pipes 11 are arranged between the first header tank 41 and the second header tank 42. The refrigerant passages 12 of the refrigerant pipes 11 communicate with the refrigerant channel in the first header tank 41 and the refrigerant channel in the second header tank 42. The first header tank 41, the second header tank 42, and the refrigerant pipes 11 arranged between the first header tank 41 and the second header tank 42 define a first heat exchange part 401.

Similarly, as shown in FIG. 2 and FIG. 3, the third header tank 43 and the fourth header tank 44 are arranged parallel at a predetermined distance. The refrigerant pipes 11 are arranged between the third header tank 43 and the fourth header tank 44, and spaced from each other. The refrigerant passages 12 of the refrigerant pipes 11 communicate with the refrigerant channel in the third header tank 43 and the refrigerant channel in the fourth header tank 44. The third header tank 43, the fourth header tank 44, and the refrigerant pipes 11 arranged between the third header tank 43 and the fourth header tank 44 define a second heat exchange part 402.

As shown in FIG. 3, the second heat exchange part 402 is arranged on the upstream side in the flow direction of air in the air passage, and the first heat exchange part 401 is arranged on the downstream side in the flow direction of air in the air passage. In the following explanation, the upstream side in the flow direction of air in the air passage is only called as "upstream side", and the downstream side in the flow direction of air in the air passage is only called as "downstream side."

A joint which is not illustrated is prepared at the end of the first header tank 41 as a refrigerant entrance. A divider plate which is not illustrated is disposed inside of the first header tank 41 at approximately center in the length direction to define a first division and a second division. Corresponding to this, the refrigerant pipes 11 are separated into a first group and a second group.

Refrigerant supplied to the first division of the first header tank 41 from the refrigerant entrance is distributed to the refrigerant pipes 11 of the first group, and flows into the second header tank 42 through the refrigerant pipes 11 of the first group.

Refrigerant which flowed into the second header tank 42 is distributed to the refrigerant pipes 11 of the second group, and flows into the second division of the first header tank 41 through the refrigerant pipes 11 of the second group. Thus, a channel is formed in the first heat exchange part 401 to make refrigerant to flow in the U-shape.

A divider plate which is not illustrated is disposed inside of the third header tank 43 at approximately center in the length direction to define a third division and a fourth division. The second division of the first header tank 41 and the third division of the third header tank 43 are located adjacent to each other, and communicate with each other. Moreover, the plural refrigerant pipes 11 are separated into the third group and the fourth group to correspond to the third division and the fourth division of the third header tank 43.

The refrigerant which flowed in order of the second division of the first header tank 41 flows into the third division of the third header tank 43. The refrigerant which flowed into the third division of the third header tank 43 is distributed to the refrigerant pipes 11 of the third group, and flows into the fourth header tank 44 through the refrigerant pipes 11 of the third group.

The refrigerant which flowed into the fourth header tank 44 is distributed to the refrigerant pipes 11 of the fourth group, and flows into the fourth division of the third header tank 43 through the refrigerant pipes 11 of the fourth group. Thus, a channel is formed in the second heat exchange part 402 to make refrigerant to flow in the U-shape.

A joint which is not illustrated is prepared in the end of the third header tank 43 as a refrigerant exit. The refrigerant of the fourth division of the third header tank 43 flows out of the refrigerant exit towards the compressor 2. The first to fourth header tanks 41-44, the plural refrigerant pipes 11, and the flow of refrigerant are not limited to the above description.

As mentioned above, among the plural clearances between the plural refrigerant pipes 11, the regenerator 20 is arranged in a predetermined clearance.

The regenerator 20 has a regenerative material case 21 which defines the outer shape, and a regenerative material 22 housed in the regenerative material case 21. The regenerative material case 21 has a flat pipe shape and houses the regenerative material 22 inside. The regenerative material case 21 is fixed to the refrigerant pipe 11 arranged at the both sides of the regenerative material case 21 with a joining material excellent in heat transfer, such as brazing material or adhesives. Thereby, the regenerative material case 21 is thermally connected to the refrigerant pipe 11 arranged at the both sides.

In the first embodiment, the regenerative material 22 contains paraffine or hydrate, and the melting point of the regenerative material 22 is adjusted to about 3-10° C. Therefore, the regenerative material 22 exchanges heat with the refrigerant flowing through the refrigerant pipe 11 and is solidified, and can store regenerative heat of the refrigerant.

Among the plural clearances formed between the refrigerant pipes 11, the clearances where the regenerator 20 is not arranged work as air passages. Plural air passage fins 30 are arranged in the air passages.

The air passage fin 30 has a function of facilitating the heat exchange between air to be sent mainly to the vehicle cabin, and the refrigerant and the regenerative material 22. The air passage fin 30 is fixed to the refrigerant pipe 11 arranged at the both sides of the air passage fin 30 with a joining material excellent in heat transfer, such as brazing material or adhesives. Thereby, the air passage fin 30 is thermally connected to the refrigerant pipe 11 arranged at the both sides. Moreover, the air passage fin 30 is thermally connected with the regenerator 20 through the refrigerant pipe 11.

A corrugated fin formed wavelike by bending a metal plate such as thin aluminum plate is used as an example of the air passage fin 30. The air passage fin 30 may have plural louvers.

<Configuration of Evaporator 10>

The evaporator 10 of the first embodiment is characterized in the configuration of the air passage fin 30.

As shown in FIG. 3 and FIG. 4, the air passage fin 30 has an upstream side outer fin 31 located on the upstream side in the flow direction of air, and a downstream side outer fin 32 located on the downstream side than the upstream side outer fin 31 in the flow direction of air. The upstream side outer fin 31 and the downstream side outer fin 32 may be components different from each other, or may be one-piece component formed integrally.

That is, the upstream side outer fin 31 can be an example of "a part of the air passage fin located on the upstream side in the air flow direction of the air passage." The downstream side outer fin 32 can be an example of "a part of the air passage fin located on the downstream side in the air flow direction of the air passage."

As shown in FIG. 3, a pitch of the plural fins of the upstream side outer fin 31 is wider than a pitch of the plural fins of the downstream side outer fin 32. Moreover, a total area of the plural fins of the upstream side outer fin 31 is smaller than a total area of the plural fins of the downstream side outer fin 32. Thereby, a thermal resistance between the upstream side outer fin 31 and the air which flows through the air passage becomes larger than a thermal resistance between the downstream side outer fin 32 and the air which flows through the air passage.

As mentioned above, the air passage fin 30 is thermally connected with the regenerator 20 through the refrigerant pipe 11. Here, the upstream side outer fin 31 is located close to the regenerative material 22 on the upstream side, through the refrigerant pipe 11. Moreover, the downstream side outer fin 32 is located close to the regenerative material 22 on the downstream side, through the refrigerant pipe 11. Therefore, the upstream side outer fin 31 is thermally connected with the regenerative material 22 located in the upstream side through the refrigerant pipe 11, and the downstream side outer fin 32 is thermally connected with the regenerative material 22 located in the downstream side through the refrigerant pipe 11. Therefore, the thermal resistance between the air on the upstream side in the air passage and the regenerative material 22 located in the upstream side becomes larger than the thermal resistance between the air on the downstream side in the air passage and the regenerative material 22 located in the downstream side.

<Operation of Evaporator 10>

In the refrigerating cycle device 1, for example when an air conditioning demand such as cooling demand is input by an occupant, the compressor 2 is driven by the torque transfer from the engine 5. Thereby, refrigerant circulates through the refrigerating cycle device 1. The evaporator 10 evaporates the low-pressure refrigerant which flows through the refrigerant passage 12, and cools the air which flows in the air passage through the outer wall of the refrigerant pipe 11 and the air passage fin 30, and cools the regenerative material 22 housed in the regenerator 20. Due to the evaporation latent heat of refrigerant, the regenerative material 22 is solidified, when the temperature becomes lower than a coagulating point.

When the vehicle temporarily stops, the engine 5 stops by idling stop control in order to reduce the consumption energy. Thereby, the drive of the compressor 2 stops, and the flow of the refrigerant stops in the refrigerating cycle device 1. Therefore, the refrigerant of the evaporator 10 gradually loses the ability of cooling air. In this process, the heat of air is transmitted to the regenerative material 22 through the air passage fin 30, the refrigerant pipe 11, and the regenerative material case 21. That is, the regenerative material 22 gradually absorbs heat from air (namely, gradually radiates coolness to air), and cools air. Therefore, the evaporator 10 of the first embodiment can cool air by the regenerative material 22, even while the refrigerating cycle device 1 stops temporarily.

In the evaporator 10 of the first embodiment, due to the configuration of the air passage fin 30 mentioned above, the thermal resistance between the upstream side air and the regenerative material 22 located in the upstream side is larger than the thermal resistance between the downstream side air and the regenerative material 22 located in the downstream side. Therefore, the melting start timing of the regenerative material 22 located in the upstream side becomes late, and approaches the melting start timing of the regenerative material 22 located in the downstream side in the evaporator 10. Therefore, in the evaporator 10, both of the melting finish timing of the regenerative material 22 located in the upstream side and the melting finish timing of the regenerative material 22 located in the downstream side can be made late.

<Comparison Between the Evaporator 10 of the First Embodiment and an Evaporator 100 of a Comparative Example>

Here, the capacity of cooling air, at an idling stop time, is compared between the evaporator 10 of the first embodiment and an evaporator 100 of a comparative example.

Figure 5:
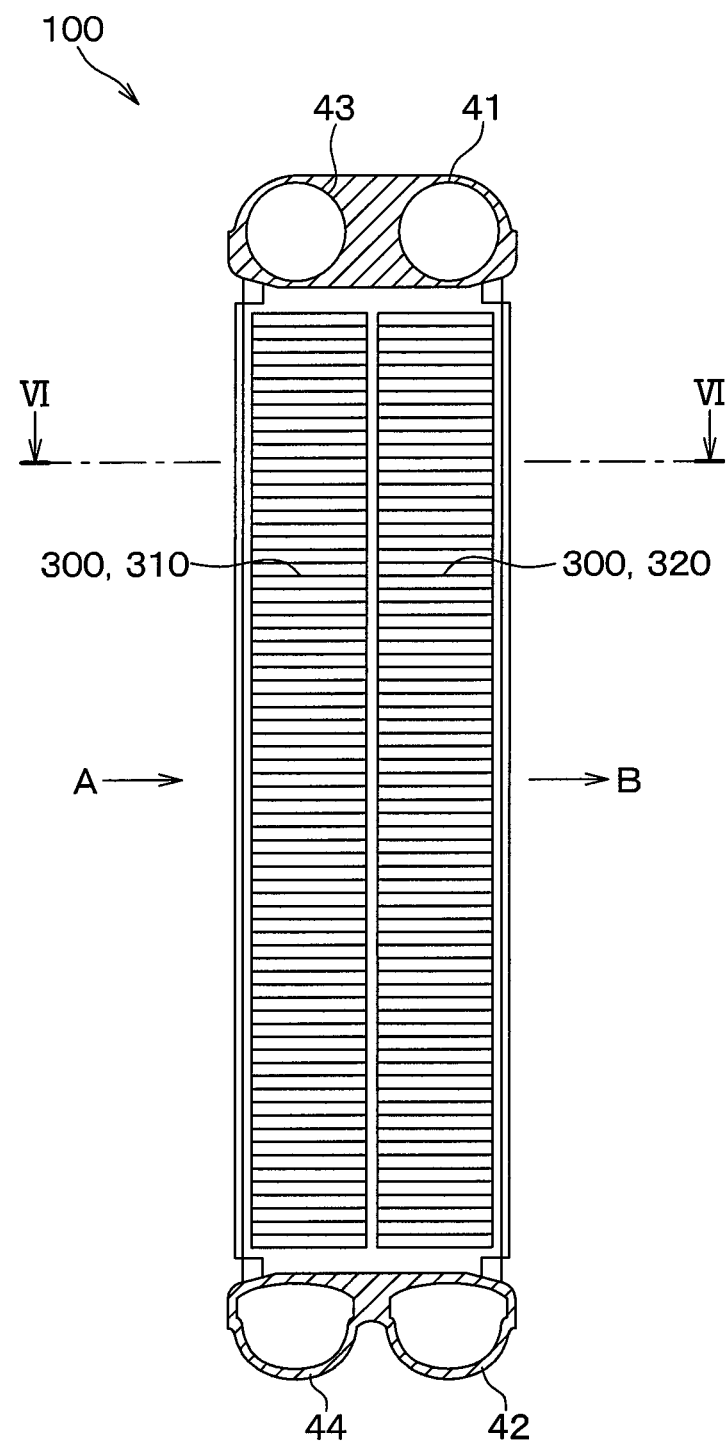
FIG. 5 is a cross-sectional view of an evaporator of a comparative example.
Figure 6:
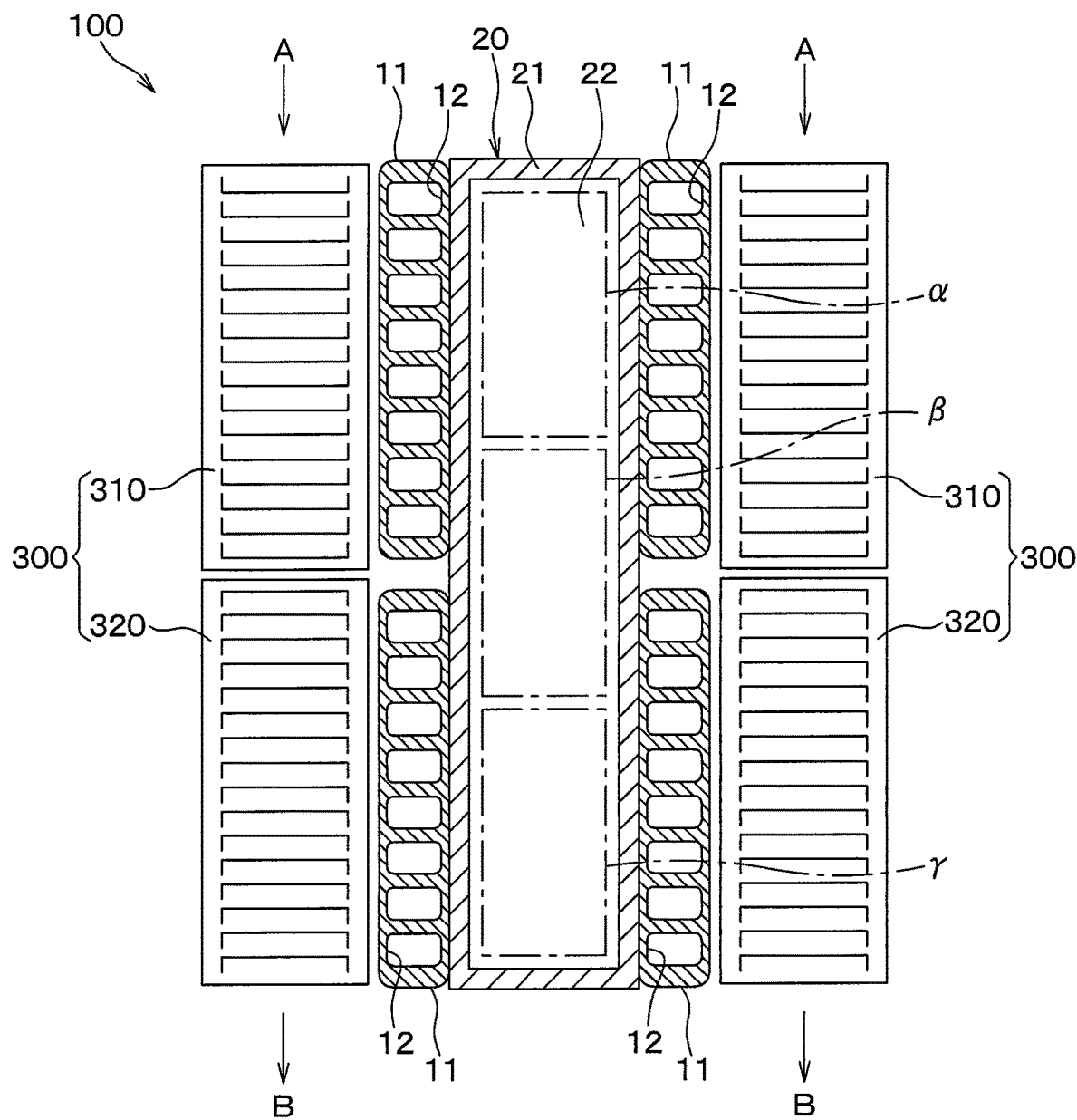
FIG. 6 is a partial cross-sectional view of the evaporator of the comparative example.

As shown in FIG. 5 and FIG. 6, the evaporator 100 of the comparative example is different from the evaporator 10 of the first embodiment in the configuration of the air passage fin 300. The air passage fin 300 of the evaporator 100 of the comparative example includes an upstream side outer fin 310 in the upstream side of the flow direction of air, and a downstream side outer fin 320 in the downstream side of the upstream side outer fin 310 in the flow direction of air.

However, in the comparative example, the pitch of the plural fins on the upstream side outer fin 310 is almost the same as the pitch of the plural fins on the downstream side outer fin 320. Moreover, the total area of the plural fins on the upstream side outer fin 310 is almost the same as the total area of the plural fins on the downstream side outer fin 320. Therefore, the thermal resistance between the upstream side outer fin 310 and the air which flows through the air passage is almost the same as the thermal resistance between the downstream side outer fin 320 and the air which flows through the air passage.

Figure 7:
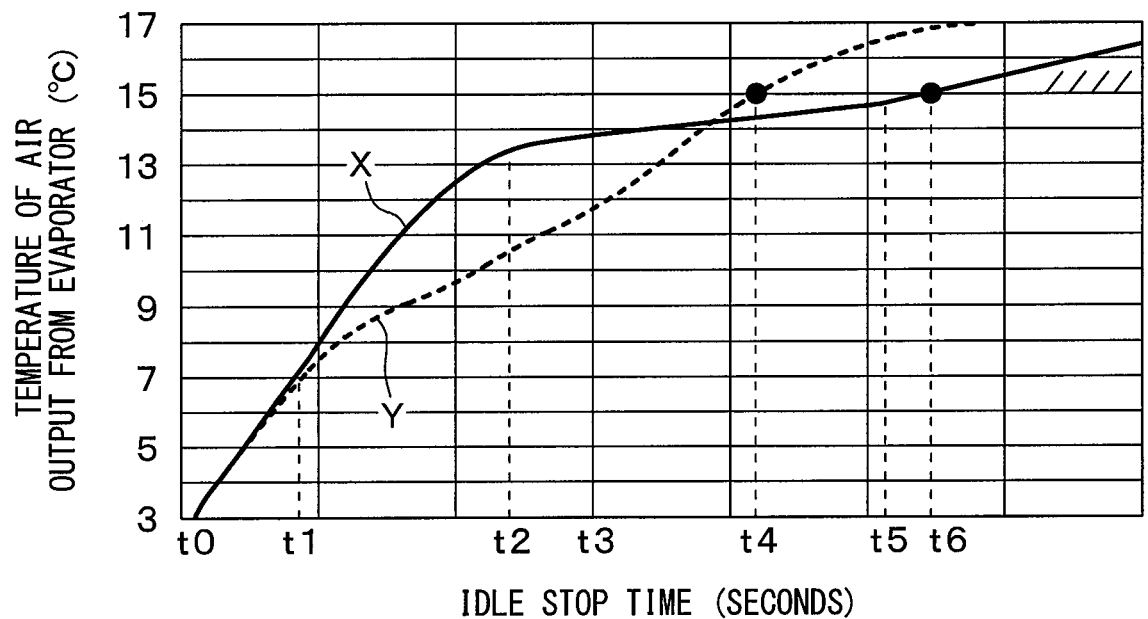
FIG. 7 is a characteristic view of air temperature blown from the evaporator at an idling stop time.

FIG. 7 analyzes a relation between a time period elapsed after an engine stop by idling stop, and a temperature of air blown off from the evaporator 10 towards the vehicle cabin. In the following explanation, the temperature of air blown off from the evaporator 10 towards the vehicle cabin is called as blow-off air temperature. In FIG. 7, the solid line X represents the blow-off air temperature of the evaporator 10 of the first embodiment, and the dashed line Y represents the blow-off air temperature of the evaporator 100 of the comparative example.

The blow-off air temperature of the evaporator 10 of the first embodiment rises in accordance with the fall in the cooling ability of the refrigerant of the evaporator 10, after the engine 5 stops at the time t0 till the time t2. The regenerative material 22 located in the upstream side and the regenerative material 22 located in the downstream side begin to melt at the almost same time around the time t2, and most of the regenerative material 22 finishes melting at the time t5. Therefore, the rise of the blow-off air temperature is suppressed from the time t2 to the time t5. After the time t5, although the increasing rate of the blow-off air temperature of the evaporator 10 becomes larger than the increasing rate before the time t5, the increasing rate is restricted by evaporation of the condensed water adhering to the air passage fin 30. The blow-off air temperature of the evaporator 10 of the first embodiment reaches, at the time t6, 15° C. which is a permissive temperature from which an occupant can get a feeling of low temperature.

In contrast, the blow-off air temperature of the evaporator 100 of the comparative example rises in accordance with the fall in the cooling ability of the refrigerant of the evaporator 100, after the engine 5 stops at the time t0 till the time t1. The regenerative material 22 begins melting around the time t1, and most of the regenerative material 22 finishes melting at the time t3. Therefore, the rise of the blow-off air temperature is suppressed from the time t1 to the time t3. The melting start time t1 of the regenerative material 22 of the comparative example is earlier than the melting start time t2 of the regenerative material 22 of the first embodiment. Moreover, the time t3 when most of the regenerative material 22 of the comparative example finishes melting is earlier than the time t5 when most of the regenerative material 22 of the first embodiment finishes melting.

In the comparative example, after the time t3, the increasing rate of the blow-off air temperature of the evaporator 100 becomes larger than the increasing rate before the time t3. In addition, the increasing rate is gradually reduced by evaporation of the condensed water adhering to the air passage fin 300 from the time t4 around. The blow-off air temperature of the evaporator 100 of the comparative example reaches, at the time t4, 15° C. which is the permissive temperature from which an occupant can get a feeling of low temperature.

Thus, the time t6 when the blow-off air temperature of the evaporator 10 of the first embodiment reaches the permissive temperature by which an occupant feel a low temperature is later than the time t4 when the blow-off air temperature of the evaporator 100 of the comparative example reaches the permissive temperature.

Next, the melting rate of the regenerative material 22 of the evaporator 100 of the comparative example is explained after the engine is stopped by idling stop.

The regenerative material 22 of the evaporator 100 of the comparative example is divided into three areas α, β, and γ from the upstream side. The graph of FIG. 8 analyzes the melting behavior of the regenerative material 22 in each of the areas α, β, and γ. The three areas α, β, and γ are illustrated in FIG. 6. In the following explanation, the regenerative material 22 in the area α on the upstream side is called as a most upstream regenerative material 22, the regenerative material 22 in the area β downstream of the area α is called as a middle regenerative material 22, and the regenerative material 22 in the area γ further downstream of the area β is called as a most downstream regenerative material 22.

Figure 8:
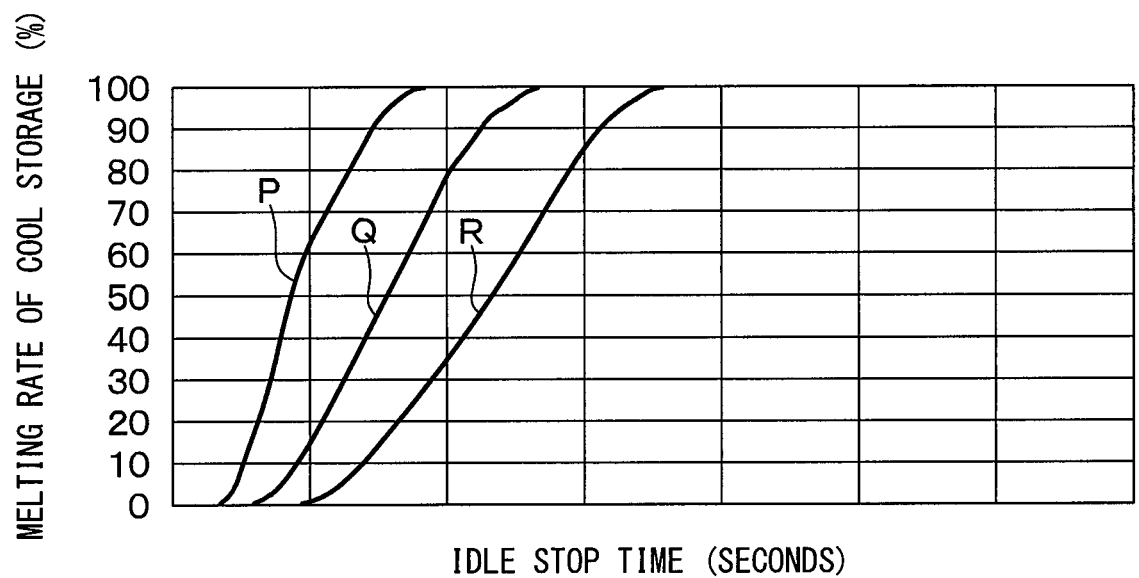
FIG. 8 is a characteristic view of a melting rate of a regenerative material in the evaporator of the comparative example.

In FIG. 8, the solid line P represents the melting rate of the most upstream regenerative material 22, the solid line Q represents the melting rate of the middle regenerative material 22, and the solid line R represents the melting rate of the most downstream regenerative material 22.

The regenerative material 22 of the evaporator 100 of the comparative example, from the start of idling stop, starts melting in order of the most upstream regenerative material 22, the middle regenerative material 22, and the most downstream regenerative material 22. That is, the melting start time of the most upstream regenerative material 22 is earlier than the melting start time of the middle regenerative material 22 and the most downstream regenerative material 22. The melting start time of the middle regenerative material 22 is earlier than the melting start time of the most downstream regenerative material 22.

Moreover, the melting finish time of the most upstream regenerative material 22 is earlier than the melting finish time of the middle regenerative material 22 and the most downstream regenerative material 22. The melting finish time of the middle regenerative material 22 is earlier than the melting finish time of the most downstream regenerative material 22.

This is because a temperature difference is large between the upstream side air and the most upstream regenerative material 22 and because a temperature difference is small between the downstream side air and the most downstream regenerative material 22. That is, due to the difference in the temperature difference, the quantity of heat per unit time which moves from the air to the most upstream regenerative material 22 becomes larger than the quantity of heat per unit time which moves from the air to the most downstream regenerative material 22. Moreover, it is thought that the heat of the regenerative material 22 which starts melting at an early stage is used for condensation of moisture in the air. Therefore, the regenerative material 22 of the evaporator 100 of the comparative example starts melting from the most upstream regenerative material 22 at an early stage, and finishes melting at an early stage.

The evaporator 10 of the first embodiment mentioned above generates the following action and effect compared with the evaporator 100 of the comparative example.

(1) In the evaporator 10 of the first embodiment, the air passage fin 30 is configured so that the thermal resistance between the regenerative material 22 located in the upstream side and the air which flows through the air passage becomes larger than the thermal resistance between the regenerative material 22 located in the downstream side and the air which flows through the air passage.

In the case of idling stop, since the melting start time of the regenerative material 22 located in the upstream side becomes late and approaches the melting start time of the regenerative material 22 located in the downstream side, the regenerative material 22 begins melting at the same time on the whole. Therefore, in the evaporator 10 of the first embodiment, compared with the evaporator 100 of a comparative example, it is possible to delay both the melting finish time of the regenerative material 22 located in the upstream side and the melting finish time of the regenerative material 22 located in the downstream side. Therefore, the evaporator 10 of the first embodiment can extend the time period from a start of an idling stop until the blow-off air temperature reaches the permissive temperature by which an occupant can feel low temperature.

(2) According to the first embodiment, the thermal resistance between the upstream side outer fin 31 and the air which flows through the air passage is set larger than the thermal resistance between the downstream side outer fin 32 and the air which flows through the air passage.

Accordingly, the melting start time of the regenerative material 22 located in the upstream side can be delayed, and can be brought close to the melting start time of the regenerative material 22 located in the downstream side.

(3) In the first embodiment, the pitch of the upstream side outer fin 31 is larger than the pitch of the downstream side outer fin 32.

Accordingly, the thermal resistance between the air which flows through the air passage and the upstream side outer fin 31 can be made smaller than the thermal resistance between the air which flows through the air passage and the downstream side outer fin 32.

(4) In the first embodiment, the total area of the upstream side outer fin 31 is smaller than the total area of the downstream side outer fin 32.

Accordingly, the thermal resistance between the air which flows through the air passage and the upstream side outer fin 31 can be made larger than the thermal resistance between the air which flows through the air passage and the downstream side outer fin 32.

Second Embodiment

A second embodiment is described, in which the configuration of the air passage fin 30 is modified relative to the first embodiment. Since the other configuration is the same as that of the first embodiment, only a different portion from the first embodiment is described.

Figure 9:
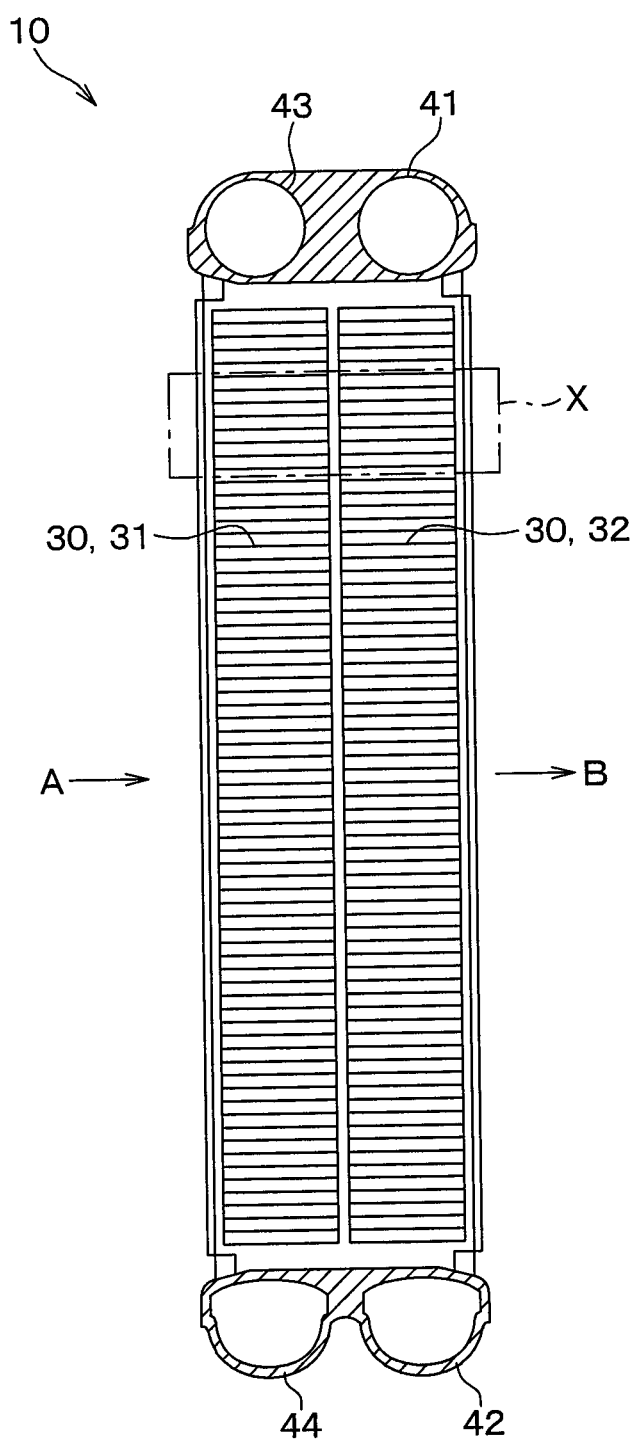
FIG. 9 is a cross-sectional view illustrating an evaporator according to a second embodiment.
Figure 10:
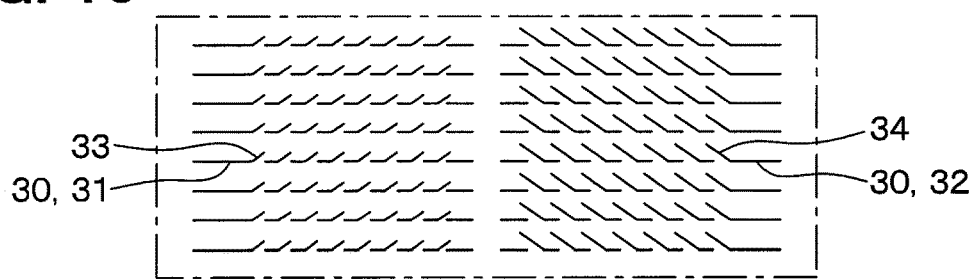
FIG. 10 is an enlarged view of X portion of FIG. 9.

As shown in FIG. 9 and FIG. 10, in the air passage fin 30 of the second embodiment, plural louvers 33 defined in the upstream side outer fin 31 are shorter than plural louvers 34 defined in the downstream side outer fin 32. Therefore, in the air passage fin 30, an area of the plural louvers 33 on the upstream side outer fin 31 is smaller than an area of the plural louvers 34 on the downstream side outer fin 32. In the air passage fin 30, an angle of the louvers 33 in the upstream side outer fin 31 may be made smaller than an angle of the louvers 34 in the downstream side outer fin 32.

Thereby, the thermal resistance between the air which flows through the air passage and the upstream side outer fin 31 becomes larger than the thermal resistance between the air which flows through the air passage and the downstream side outer fin 32. Therefore, the second embodiment can generate the same action and effect as the first embodiment mentioned above.

Third Embodiment

A third embodiment is described. The evaporator 10 of the third embodiment is characterized in the configuration of the regenerator 20.

Figure 11:
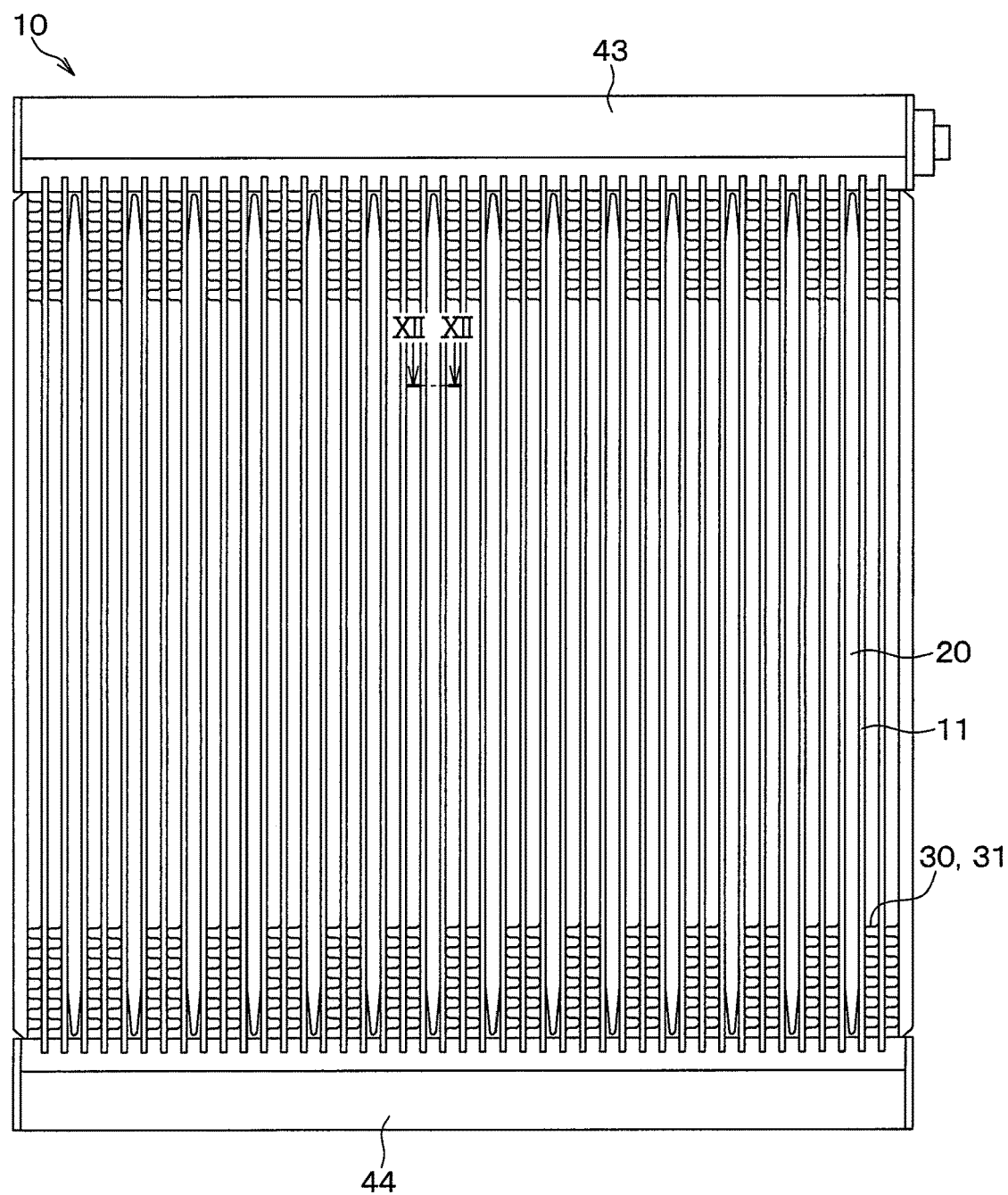
FIG. 11 is a plan view illustrating an evaporator according to a third embodiment.
Figure 12:
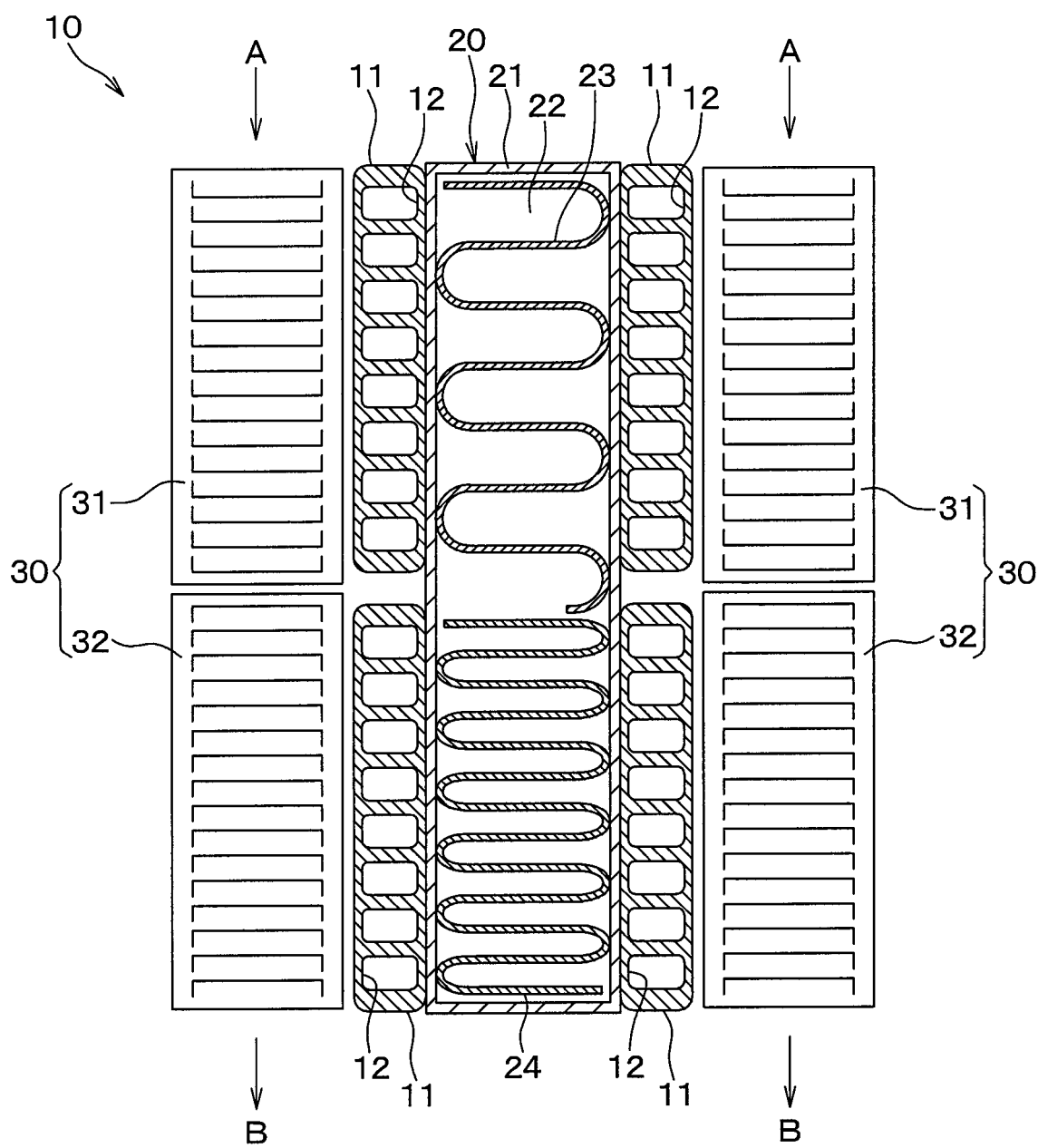
FIG. 12 is a partial cross-sectional view taken along a line XII-XII of FIG. 11.

As shown in FIG. 11 and FIG. 12, in the third embodiment, the regenerator 20 has inner fins 23 and 24 inside the regenerative material case 21 that defines the outer shape. The inner fins 23 and 24 facilitate the heat exchange between the regenerative material case 21 and the regenerative material 22. The regenerative material case 21 is thermally connected with the refrigerant pipe 11 and the air passage fin 30. Therefore, the heat exchange between the air which flows through the air passage and the regenerative material 22 is promoted by the inner fins 23 and 24. It is possible to use a wavelike corrugated fin formed by bending a metal plate, such as thin aluminum plate, as an example of the inner fin 23, 24. The corrugated fin of the third embodiment extends in the same direction as the extending direction of the refrigerant passage 12 of the refrigerant pipe 11.

The inner fin includes the upstream side inner fin 23 in the upstream side in the flow direction of air, and the downstream side inner fin 24 in the downstream side of the upstream side inner fin 23 in the flow direction of air. The upstream side inner fin 23 and the downstream side inner fin 24 may be configured from separate components, or one-piece component.

That is, in the inner fin, the upstream side inner fin 23 can be an example of "a part located on the upstream side in the air flow direction of the air passage." Moreover, the downstream side inner fin 24 can be an example of "a part located on the downstream side in the air flow direction of the air passage."

The upstream side inner fin 23 has immersed in the regenerative material 22 located in the upstream side. Therefore, the upstream side inner fin 23 thermally connects the inner wall of the regenerative material case 21 located in the upstream side and the regenerative material 22 located in the upstream side.

The downstream side inner fin 24 has immersed in the regenerative material 22 located in the downstream side. Therefore, the downstream side inner fin 24 thermally connects the inner wall of the regenerative material case 21 located in the downstream side and the regenerative material 22 located in the downstream side.

The pitch of plural fins of the upstream side inner fin 23 is larger than the pitch of plural fins of the downstream side inner fin 24. Moreover, the total area of plural fins of the upstream side inner fin 23 is smaller than the total area of plural fins of the downstream side inner fin 24. Thereby, the thermal resistance between the regenerative material 22 located in the upstream side and the upstream side inner fin 23 becomes larger than the thermal resistance between the regenerative material 22 located in the downstream side and the downstream side inner fin 24. Moreover, the thermal resistance between the regenerative material case 21 located in the upstream side and the upstream side inner fin 23 becomes larger than the thermal resistance between the regenerative material case 21 located in the downstream side and the downstream side inner fin 24. Therefore, also in the third embodiment, the thermal resistance between the air which flows through the air passage and the regenerative material 22 located in the upstream side is larger than the thermal resistance between the air which flows through the air passage and the regenerative material 22 located in the downstream side. Therefore, the third embodiment can also generate the same action and effect as the first and second embodiments.

4th Embodiment

The 4th embodiment is described. The 4th embodiment is a modification of the third embodiment.

Figure 13:
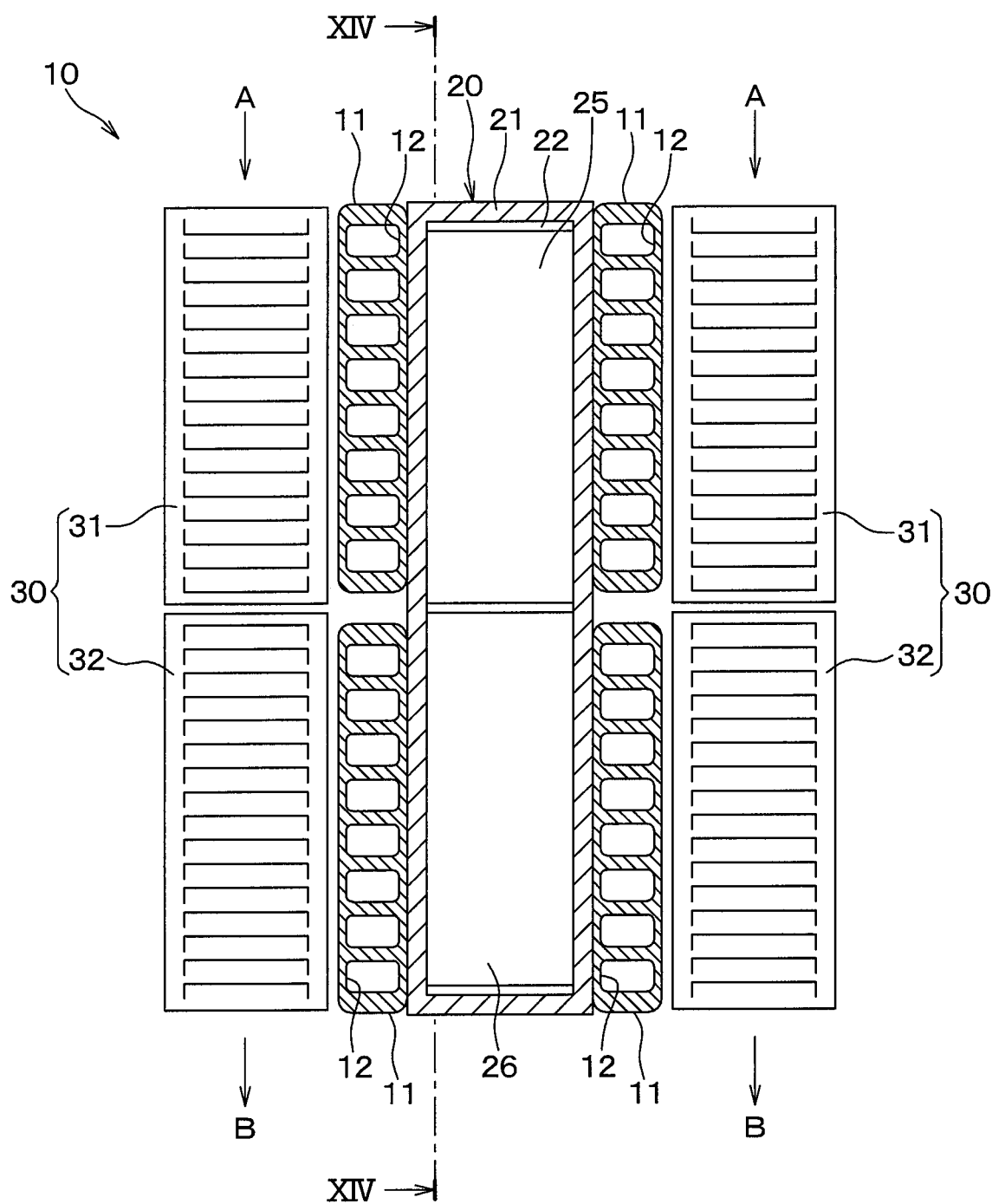
FIG. 13 is a partial cross-sectional view illustrating an evaporator according to a 4th embodiment.
Figure 14:
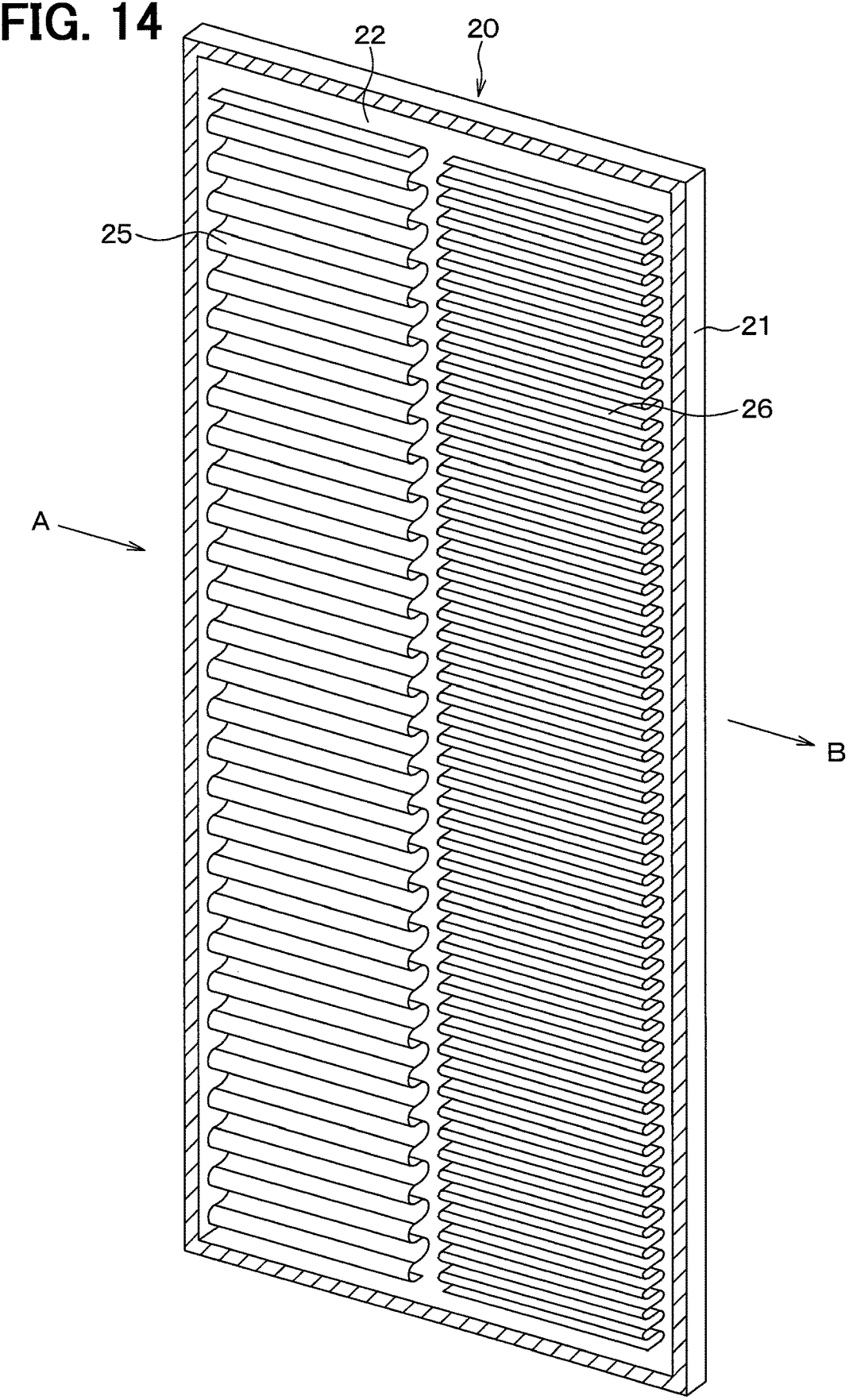
FIG. 14 is a partial sectional view taken along a line XIV-XIV of FIG. 11.

The 4th embodiment is shown in FIG. 13 and FIG. 14. In the 4th embodiment, the regenerator 20 has inner fins 25 and 26 inside the regenerative material case 21. As an example, similarly to the air passage fin 30 of the first embodiment, it is possible to use a wavelike corrugated fin formed by bending a metal plate, such as thin aluminum plate. The corrugated fin of the 4th embodiment extends in a direction intersecting the extending direction of the refrigerant passage 12 of the refrigerant pipe 11.

In the 4th embodiment, the inner fins 25 and 26 are the upstream side inner fin 25 on the upstream side in the flow direction of air, and the downstream side inner fin 26 on the downstream side of the upstream side inner fin 25 in the flow direction of air. The upstream side inner fin 25 and the downstream side inner fin 26 may be configured from separate components, or may be one-piece component.

The upstream side inner fin 25 has immersed in the regenerative material 22 located in the upstream side. Moreover, the upstream side inner fin 25 is in contact with the inner wall of the regenerative material case 21 located in the upstream side. Therefore, the upstream side inner fin 25 is thermally connected to the inner wall of the regenerative material case 21 located in the upstream side, and the regenerative material 22 located in the upstream side.

The downstream side inner fin 26 has immersed in the regenerative material 22 located in the downstream side. Moreover, the downstream side inner fin 26 is in contact with the inner wall of the regenerative material case 21 located in the downstream side. Therefore, the downstream side inner fin 26 is thermally connected to the inner wall of the regenerative material case 21 located in the downstream side, and the regenerative material 22 located in the downstream side.

The pitch of plural fins on the upstream side inner fin 25 is larger than the pitch of plural fins on the downstream side inner fin 26. Moreover, the total area of plural fins on the upstream side inner fin 25 is smaller than the total area of plural fins on the downstream side inner fin 26. Thereby, the thermal resistance between the regenerative material 22 located in the upstream side and the upstream side inner fin 25 becomes larger than the thermal resistance between the regenerative material 22 located in the downstream side and the downstream side inner fin 26. Moreover, the thermal resistance between the inner wall of the regenerative material case 21 located in the upstream side and the upstream side inner fin 25 becomes larger than the thermal resistance between the inner wall of the regenerative material case 21 located in the downstream side and the downstream side inner fin 26.

Therefore, the 4th embodiment can also generate the same action and effect as the first to third embodiments.

5th Embodiment

The 5th embodiment is described. The 5th embodiment is a modification of the 4th embodiment.

Figure 15:
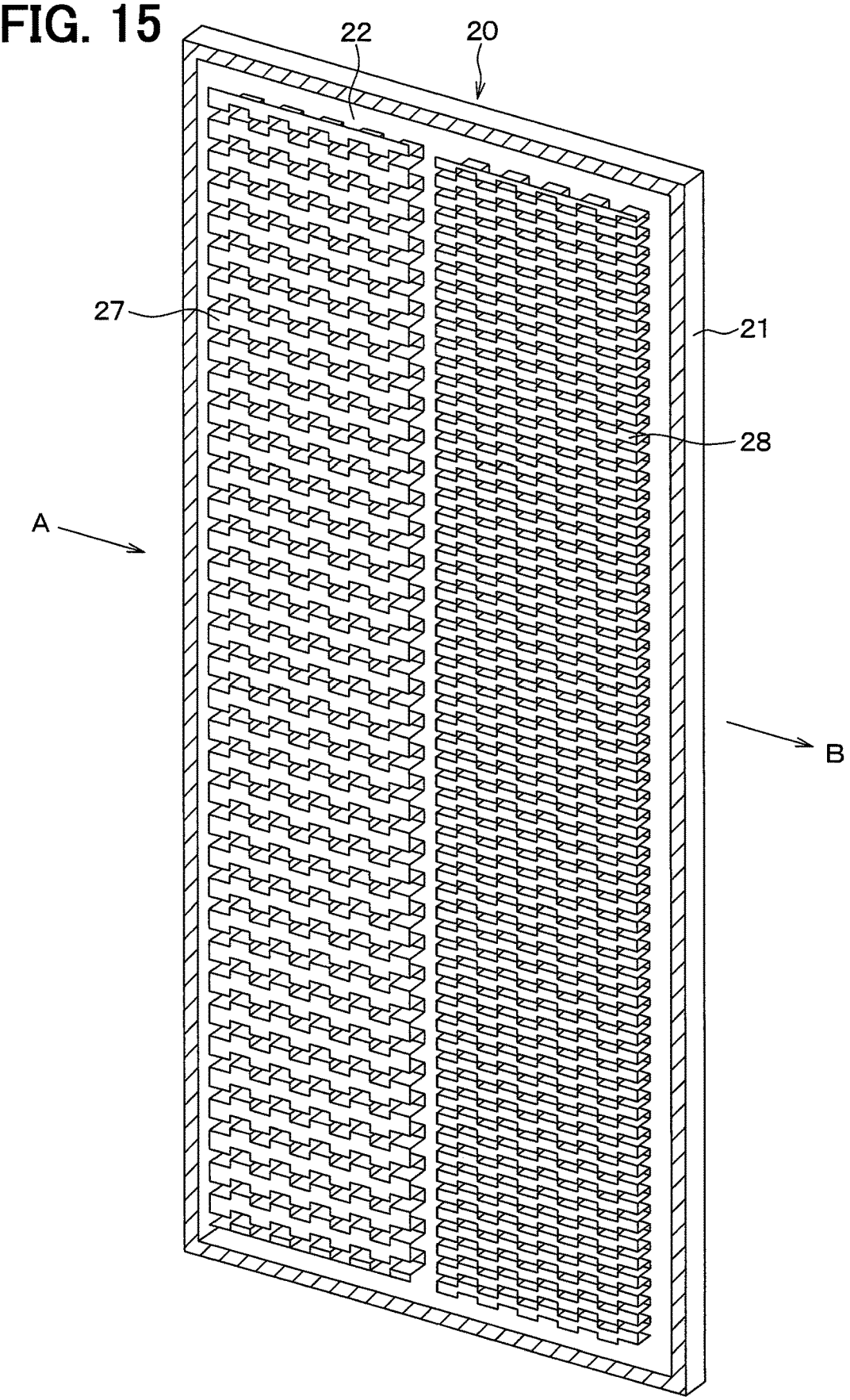
FIG. 15 is a partial sectional view illustrating an evaporator according to a 5th embodiment.

As shown in FIG. 15, in the 5th embodiment, the regenerator 20 has inner fins 27 and 28 inside the regenerative material case 21. As an example, the inner fin 27, 28 is an offset fin formed with metal plate, such as thin aluminum plate.

The offset fin is formed in rectangle wave by bending a metal plate to define a projection part and a valley part, and each side part which connects the projection part and the valley part is offset in a direction perpendicular to the air flow direction A.

In the 5th embodiment, the inner fins 27 and 28 are the upstream side inner fin 27 on the upstream side in the flow direction of air, and the downstream side inner fin 28 on the downstream side of the upstream side inner fin 27 in the flow direction of air. The upstream side inner fin 27 and the downstream side inner fin 28 may be configured from separate components, or may be one-piece component.

The pitch of the plural side parts on the upstream side inner fin 27 is larger than the pitch of the plural side parts on the downstream side inner fin 28. Moreover, the total area of the upstream side inner fin 27 is smaller than the total area of the downstream side inner fin 28. Thereby, the thermal resistance between the regenerative material 22 located in the upstream side and the upstream side inner fin 27 becomes larger than the thermal resistance between the regenerative material 22 located in the downstream side and the downstream side inner fin 28. Moreover, the thermal resistance between the inner wall of the regenerative material case 21 located in the upstream side and the upstream side inner fin 27 becomes larger than the thermal resistance between the inner wall of the regenerative material case 21 located in the downstream side and the downstream side inner fin 28.

Therefore, the 5th embodiment can also generate the same action and effect as the first to 4th embodiments.

6th Embodiment

The 6th embodiment is described. The 6th embodiment is a modification of the third embodiment.

Figure 16:
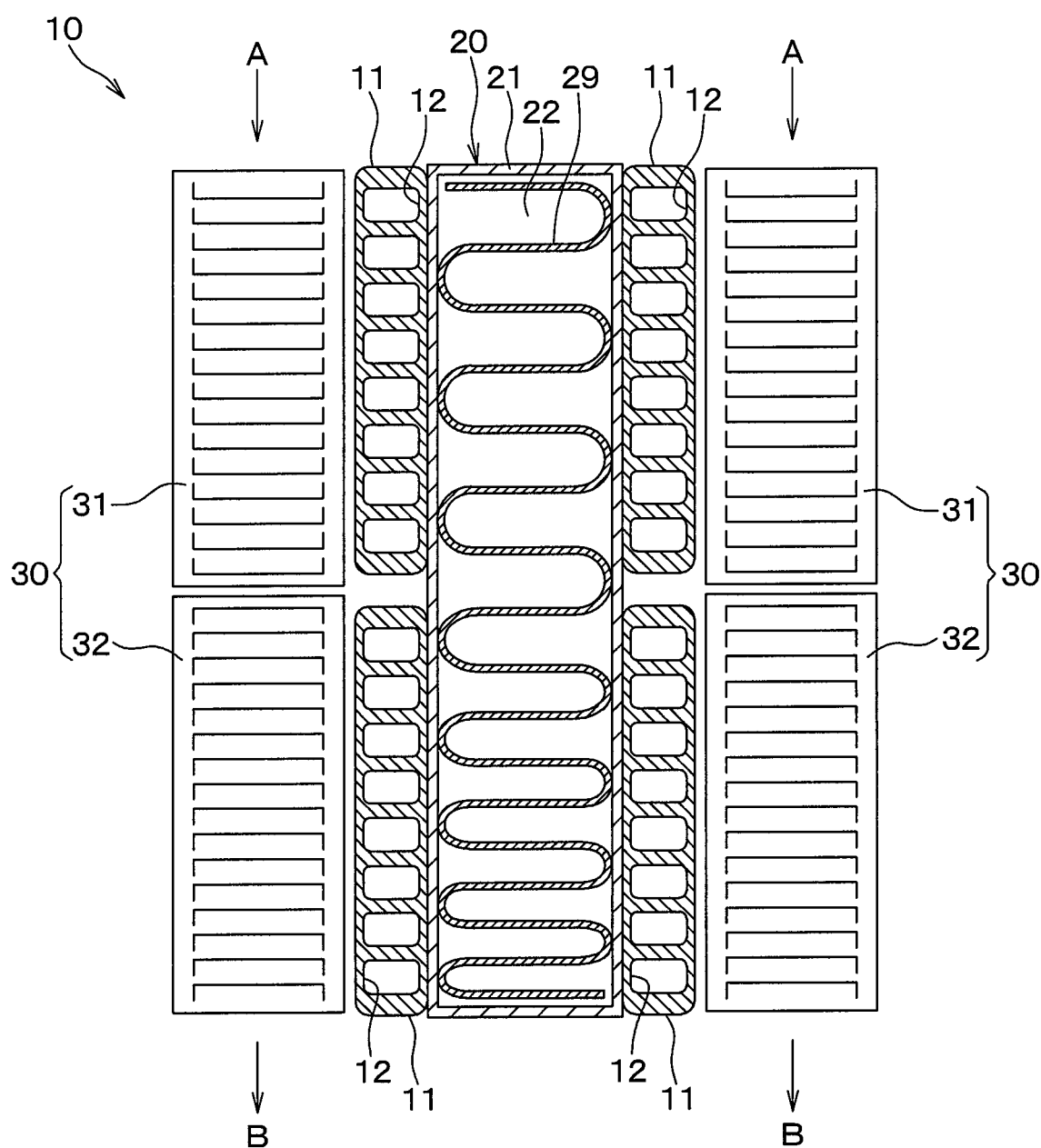
FIG. 16 is a partial cross-sectional view illustrating an evaporator according to a 6th embodiment.

As shown in FIG. 16, in the 6th embodiment, the inner fin 29 is configured such that the pitch becomes narrower gradually from the part located in the upstream side toward the part located in the downstream side. It is possible to use a wavelike corrugated fin formed by bending a metal plate, such as thin aluminum plate, as an example of the inner fin. The corrugated fin of the 6th embodiment extends in the same direction as the extending direction of the refrigerant passage 12 of the refrigerant pipe 11.

In the 6th embodiment, in addition to the same action and effect as the first to 5th embodiments, the melting start time or the melting finish time of the regenerative material 22 can be optimized and made close between the regenerative material 22 located in the upstream side and the regenerative material 22 located in the downstream side.

7th Embodiment

The 7th embodiment is described.

Figure 17:
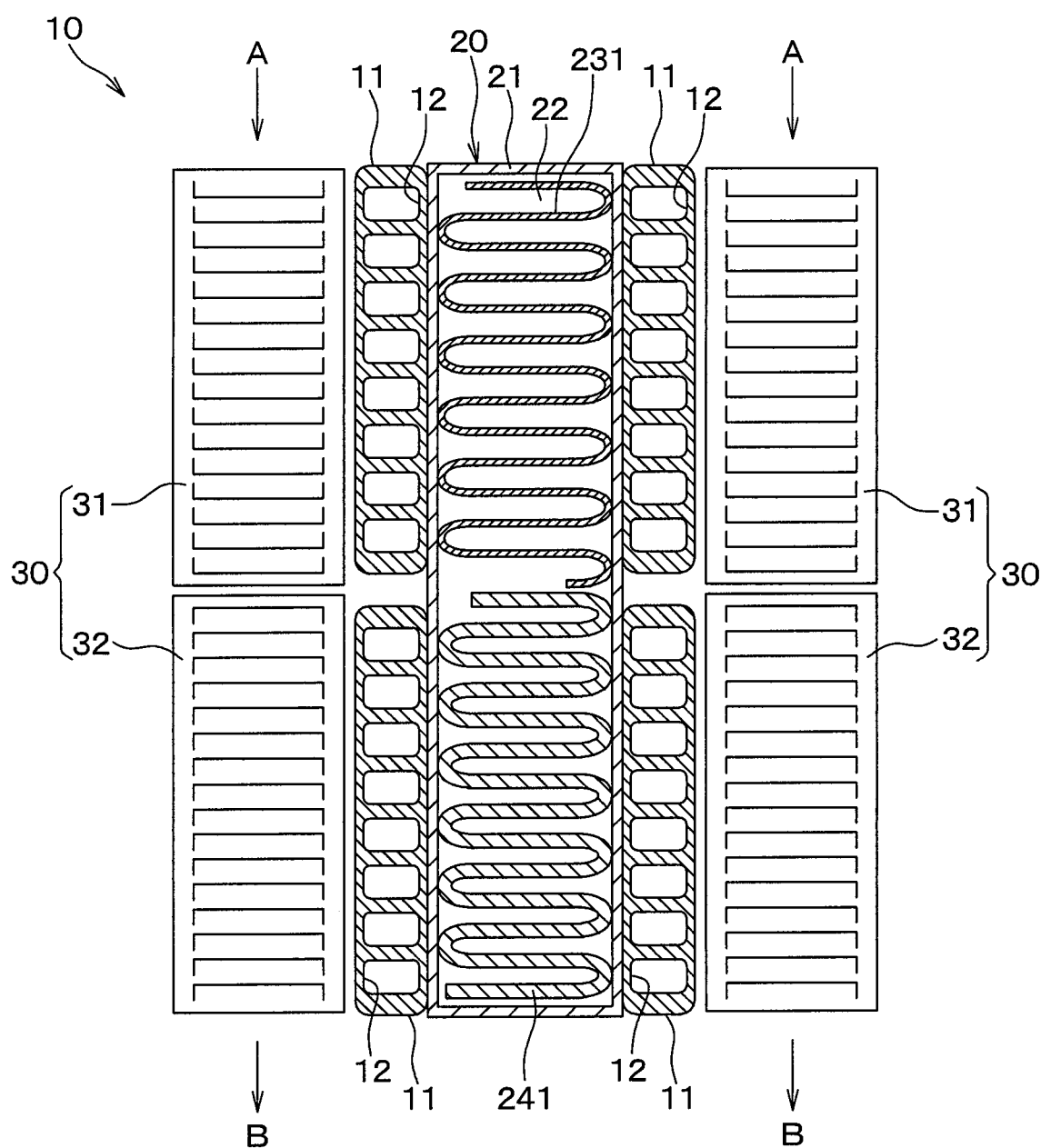
FIG. 17 is a partial cross-sectional view illustrating an evaporator according to a 7th embodiment.

As shown in FIG. 17, the inner fin of the 7th embodiment includes the upstream side inner fin 231 on the upstream side in the flow direction of air, and the downstream side inner fin 241 on the downstream side of the upstream side inner fin 231 in the flow direction of air.

The thickness of the upstream side inner fin 231 is thinner than the thickness of the downstream side inner fin 241. Therefore, the fin efficiency of the upstream side inner fin 231 is lower than the fin efficiency of the downstream side inner fin 241. Thereby, the thermal resistance between the regenerative material 22 located in the upstream side and the upstream side inner fin 231 becomes larger than the thermal resistance between the regenerative material 22 located in the downstream side and the downstream side inner fin 241. Moreover, the thermal resistance between the inner wall of the regenerative material case 21 located in the upstream side and the upstream side inner fin 231 becomes larger than the thermal resistance between the inner wall of the regenerative material case 21 located in the downstream side and the downstream side inner fin 241.

Therefore, the 7th embodiment can also generate the same action and effect as the first to 6th embodiments.

8th Embodiment

The 8th embodiment is described.

Figure 18:
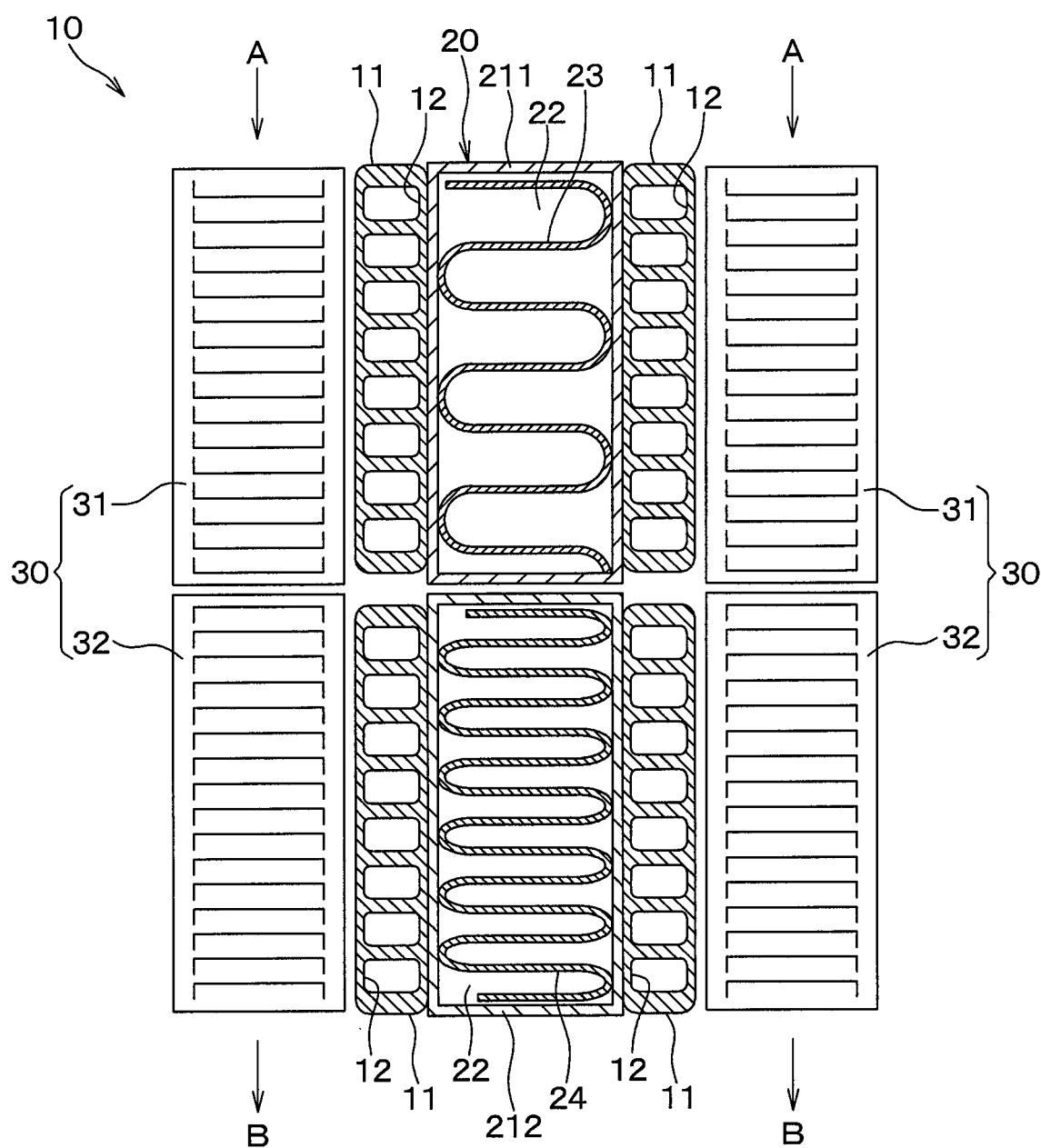
FIG. 18 is a partial cross-sectional view illustrating an evaporator according to an 8th embodiment.

As shown in FIG. 18, in the 8th embodiment, the regenerator 20 has an upstream side regenerative material case 211 and a downstream side regenerative material case 212. The upstream side inner fin 23 is housed in the upstream side regenerative material case 211, and the downstream side inner fin 24 is housed in the downstream side regenerative material case 212.

The pitch of plural fins on the upstream side inner fin 23 is larger than the pitch of plural fins on the downstream side inner fin 24. Moreover, the total area of plural fins on the upstream side inner fin 23 is smaller than the total area of plural fins on the downstream side inner fin 24. Therefore, the 8th embodiment can also generate the same action and effect as the first to 7th embodiments.

9th Embodiment

The 9th embodiment is described.

Figure 19:
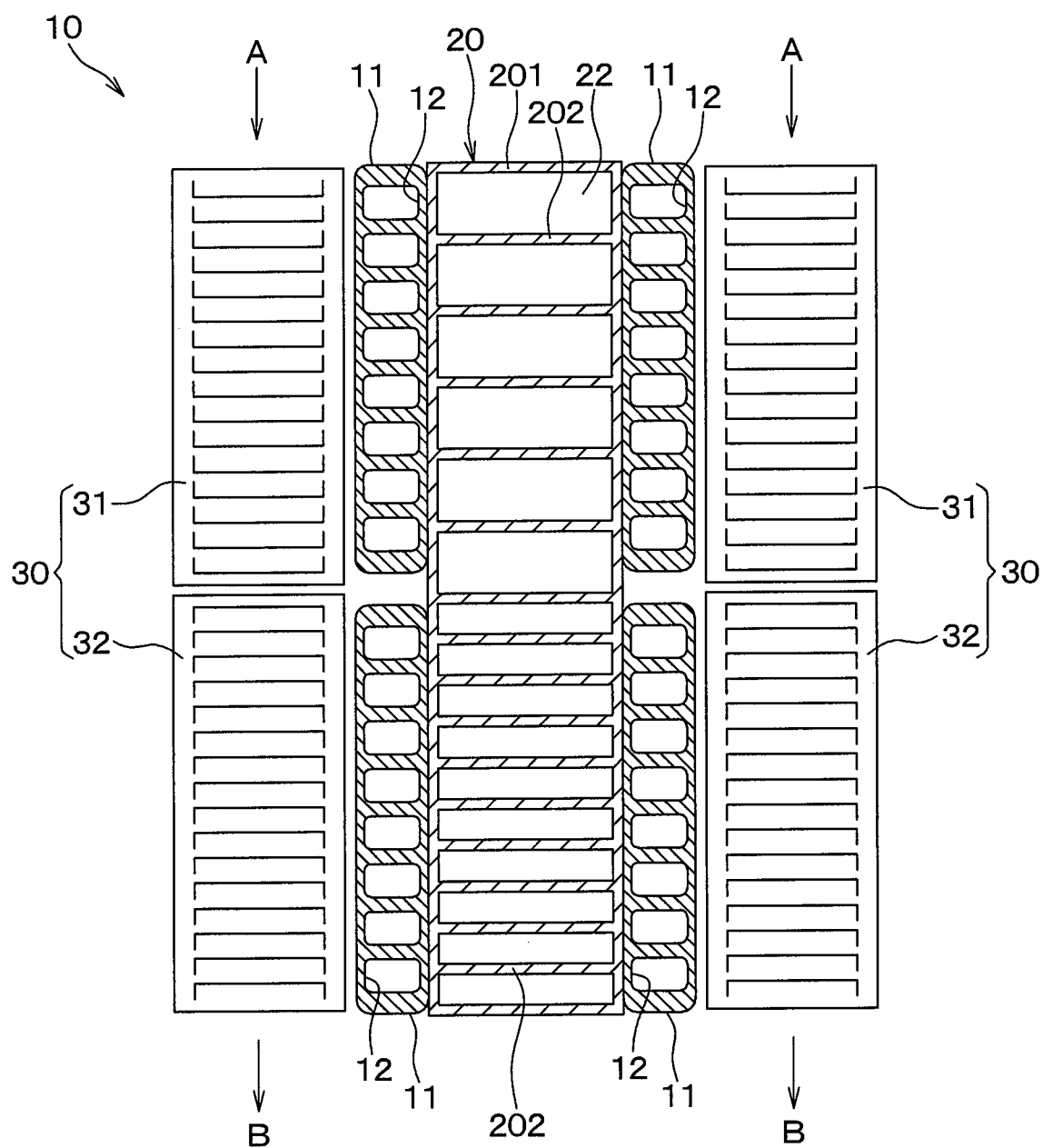
FIG. 19 is a partial cross-sectional view illustrating an evaporator according to a 9th embodiment.

As shown in FIG. 19, in the 9th embodiment, the regenerative material case 21 of the regenerator 20 has an external part 201 which defines the external shape, and plural partition parts 202 which divide a space inside the external part 201. The plural partition parts 202 are formed so that the pitch of the part located in the upstream side becomes gradually larger than the pitch of the part located in the downstream side. Therefore, the thermal resistance between the part of the plural partition parts 202 located in the upstream side and the regenerative material 22 becomes gradually larger than the thermal resistance between the part of the plural partition parts 202 located in the downstream side and the regenerative material 22. Therefore, in the 9th embodiment, the thermal resistance between the air which flows through the air passage and the regenerative material 22 located in the upstream side becomes larger than the thermal resistance between the air which flows through the air passage and the regenerative material 22 located in the downstream side. Therefore, the 9th embodiment can also generate the same action and effect as the first to 8th embodiments.

10th Embodiment

Figure 20:
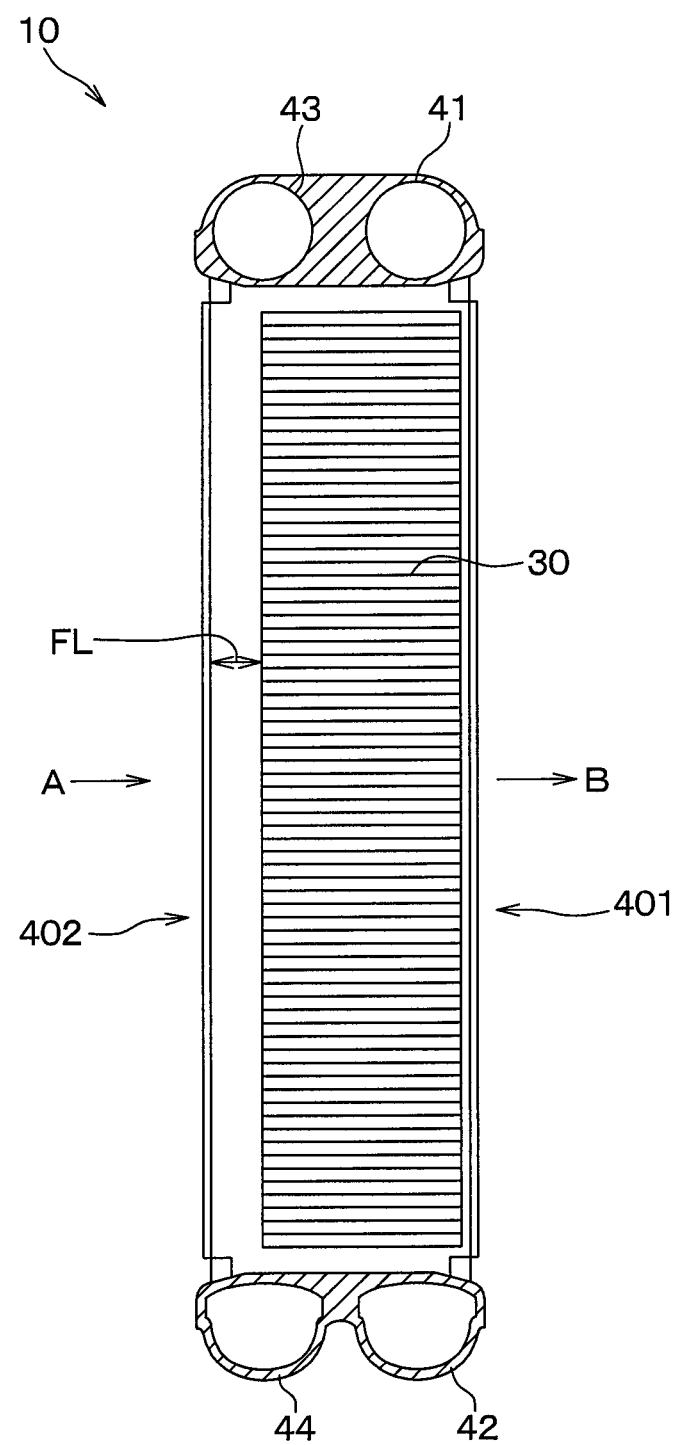
FIG. 20 is a cross-sectional view illustrating an evaporator according to a 10th embodiment.

The 10th embodiment is described with reference to FIG. 20. In the 10th embodiment, a finless area FL where no air passage fin 30 is formed is defined in the air passage outside of the refrigerant pipe 11 and the regenerator 20 at the upstream side of the air passage fin 30. In FIG. 20, the both-end arrow FL represents the range of the finless area FL. The air passage fin 30 of the 10th embodiment is configured by integrally forming the upstream side outer fin and the downstream side outer fin. Alternatively, the air passage fin 30 may include the upstream side outer fin and the downstream side outer fin which are separate components. Moreover, the fin pitch of the downstream side outer fin may be set finer than the fin pitch of the upstream side outer fin.

In the 10th embodiment, the thermal resistance between the regenerative material 22 and the air which flows through the part corresponding to the finless area FL becomes larger than the thermal resistance between the regenerative material 22 and the air which flows through the part corresponding to the air passage fin 30. Therefore, the 10th embodiment can also generate the same action and effect as the first to 9th embodiments.

11th Embodiment

Figure 21:
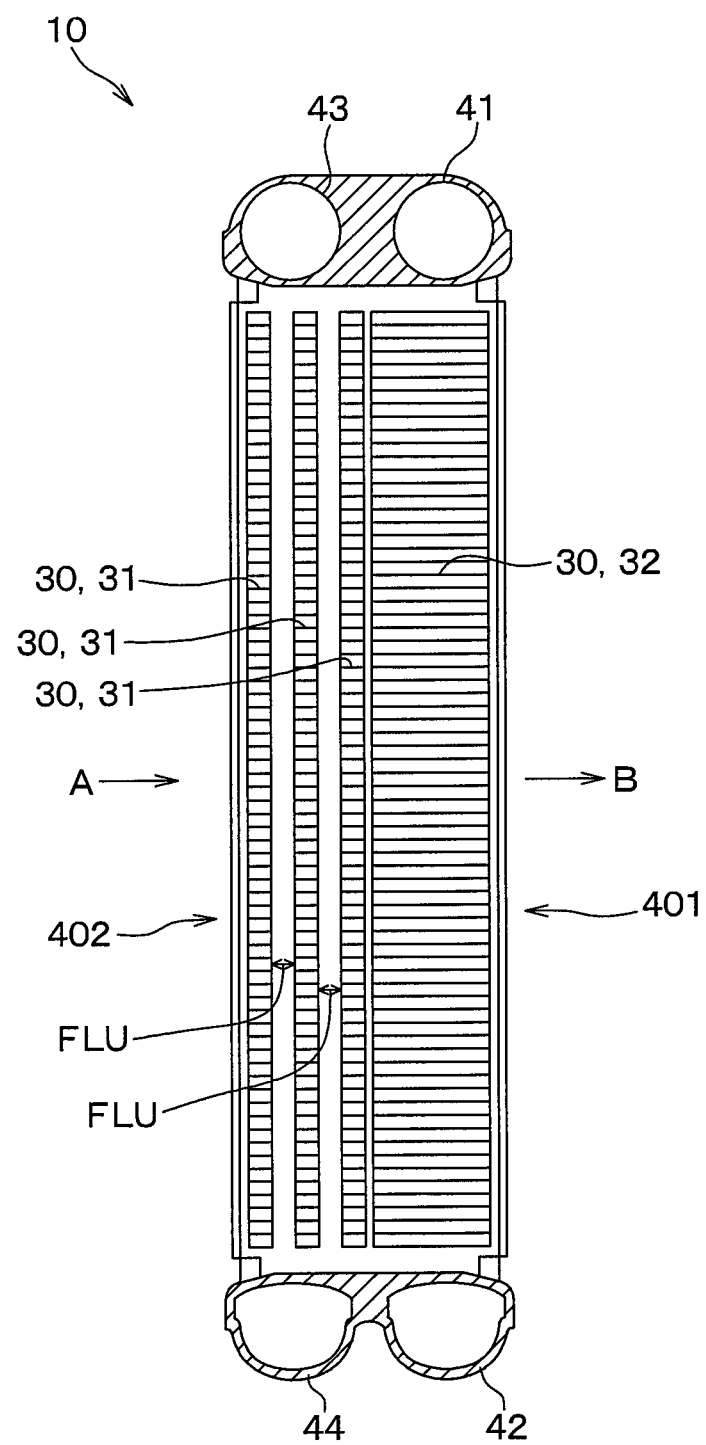
FIG. 21 is a cross-sectional view illustrating an evaporator according to an 11th embodiment.

The 11th embodiment is described with reference to FIG. 21. In the 11th embodiment, the air passage fin 30 includes the upstream side outer fin 31 and the downstream side outer fin 32. One or more upstream side finless areas FLU are formed in the upstream side outer fin 31. In FIG. 21, the both-end arrow FLU represents the range of the upstream side finless area FLU. Therefore, the upstream side outer fin 31 is formed intermittently.

The downstream side outer fin 32 has no finless area. That is, in the 11th embodiment, one or more upstream side finless areas FLU are formed in a part of the air passage fins 30 located in the upstream side. Thereby, the total area of the upstream side outer fin 31 is smaller than the total area of the downstream side outer fin 32.

In the 11th embodiment, the thermal resistance between the regenerative material 22 and the air which flows through the upstream side outer fin 31 having the upstream side finless area FLU becomes larger than the thermal resistance between the regenerative material 22 and the air which flows through the downstream side outer fin 32. Therefore, the 11th embodiment can also generate the same action and effect as the first to 10th embodiments.

In the 11th embodiment, the fin pitch of the downstream side outer fin 32 may be set finer than the fin pitch of the upstream side outer fin 31. Moreover, the air passage fin 30 may be integrally formed by the upstream side outer fin 31 and the downstream side outer fin 32.

12th Embodiment

Figure 22:
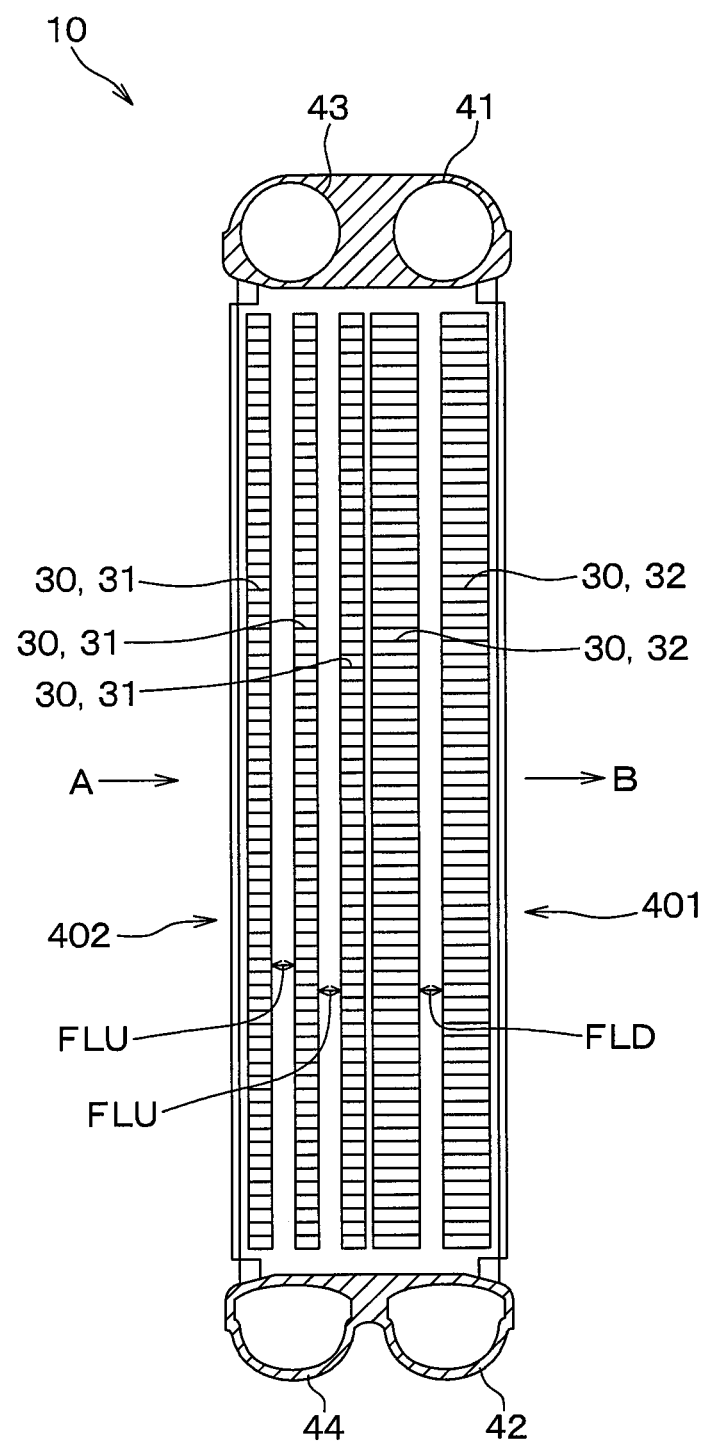
FIG. 22 is a cross-sectional view illustrating an evaporator according to a 12th embodiment.

The 12th embodiment is described with reference to FIG. 22. In the 12th embodiment, the air passage fin 30 includes the upstream side outer fin 31 and the downstream side outer fin 32. One or more upstream side finless areas FLU are formed in the upstream side outer fin 31. Therefore, the upstream side outer fin 31 is formed intermittently. One or more downstream side finless areas FLD are formed in the downstream side outer fin 32. In FIG. 22, the both-end arrow FLU represents the range of the upstream side finless area FLU, and the both-end arrow FLD represents the range of the downstream side finless area FLD. Therefore, the downstream side outer fin 32 is formed intermittently.

That is, in the 11th embodiment, one or more upstream side finless areas FLU are formed in a part of the air passage fin 30 located in the upstream side, and one or more downstream side finless areas FLD are formed in a part of the air passage fin 30 located in the downstream side.

A space volume which is the sum of the one or more upstream side finless areas FLU is larger than a space capacity which is the sum of the one or more downstream side finless areas FLD. Therefore, the total area of the upstream side outer fin 31 is smaller than the total area of the downstream side outer fin 32. Therefore, in the 11th embodiment, the thermal resistance between the air which flows through the upstream side outer fin 31 and the regenerative material 22 becomes larger than the thermal resistance between the air which flows through the downstream side outer fin 32 and the regenerative material 22. Therefore, the 12th embodiment can also generate the same action and effect as the first to 11th embodiments.

In the 12th embodiment, the fin pitch of the downstream side outer fin 32 may be set finer than the fin pitch of the upstream side outer fin 31. Moreover, the air passage fin 30 may be integrally formed by the upstream side outer fin 31 and the downstream side outer fin 32.

13th Embodiment

Figure 23:
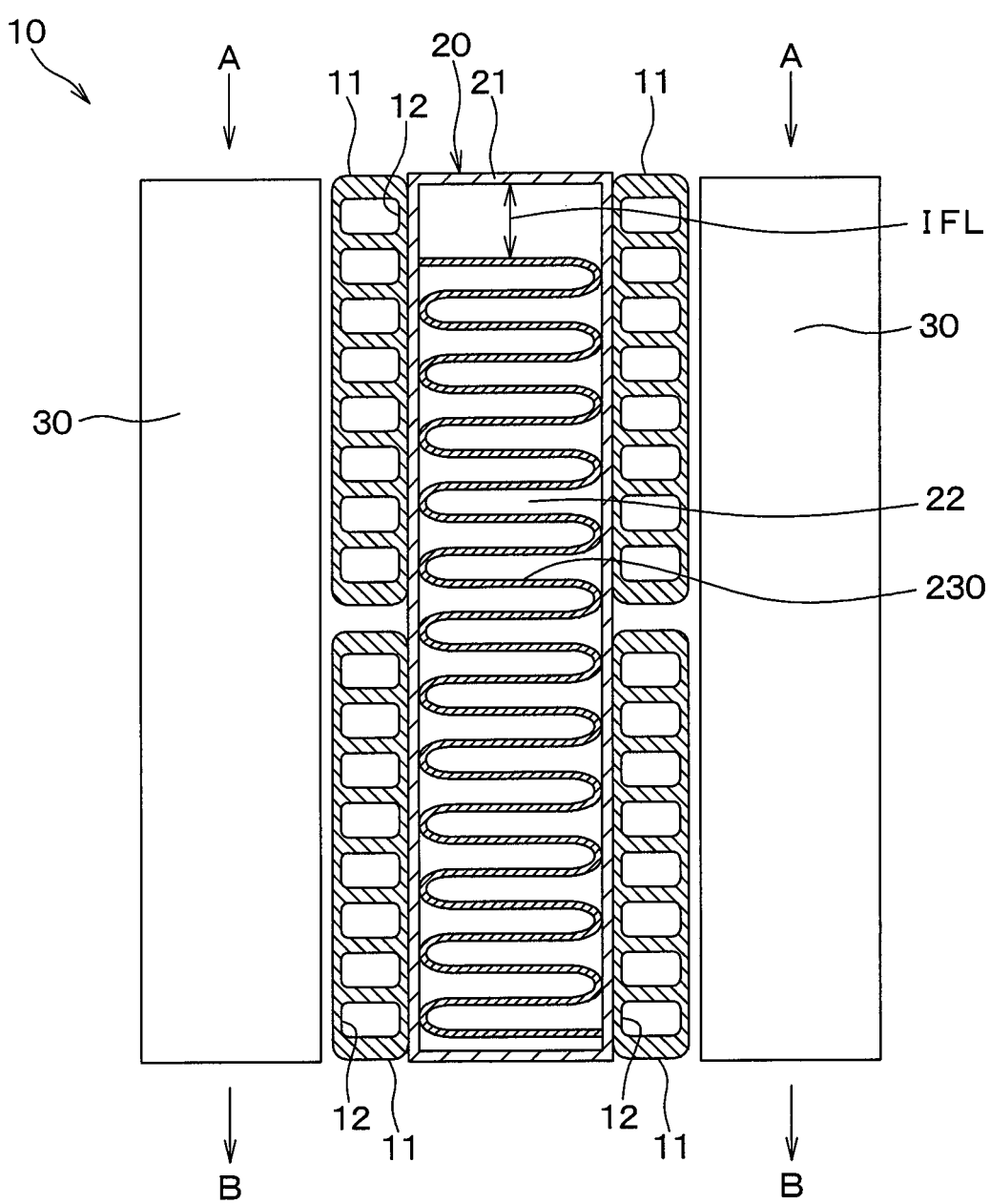
FIG. 23 is a partial cross-sectional view illustrating an evaporator according to a 13th embodiment.

The 13th embodiment is described with reference to FIG. 23. In the 13th embodiment, the regenerator 20 includes the inner fin 230 inside the regenerative material case 21 which defines the outer shape. An inner finless area IFL where no inner fin 230 is formed is defined inside the regenerative material case 21, at the upstream side of the inner fin 230. In FIG. 23, the both-end arrow IFL represents the range of the inner finless area IFL.

In the 13th embodiment, the thermal resistance between the regenerative material 22 and the regenerative material case 21 in an area where the inner finless area IFL is defined becomes larger than the thermal resistance between the regenerative material 22 and the regenerative material case 21 in an area where the inner fin 230 is arranged. Therefore, the thermal resistance between the air which flows through the air passage outside of the inner finless area IFL and the regenerative material 22 becomes larger than the thermal resistance between the air which flows through the air passage outside of the inner fin 230 and the regenerative material 22. Therefore, the 13th embodiment can also generate the same action and effect as the first to 12th embodiments.

In addition, the inner fin 230 of the 13th embodiment integrally has the upstream side inner fin and the downstream side inner fin. Alternatively, as for the inner fin 230, the upstream side inner fin and the downstream side inner fin may be separate components. Moreover, the fin pitch of the downstream side inner fin may be set finer than the fin pitch of the upstream side inner fin.

14th Embodiment

Figure 24:
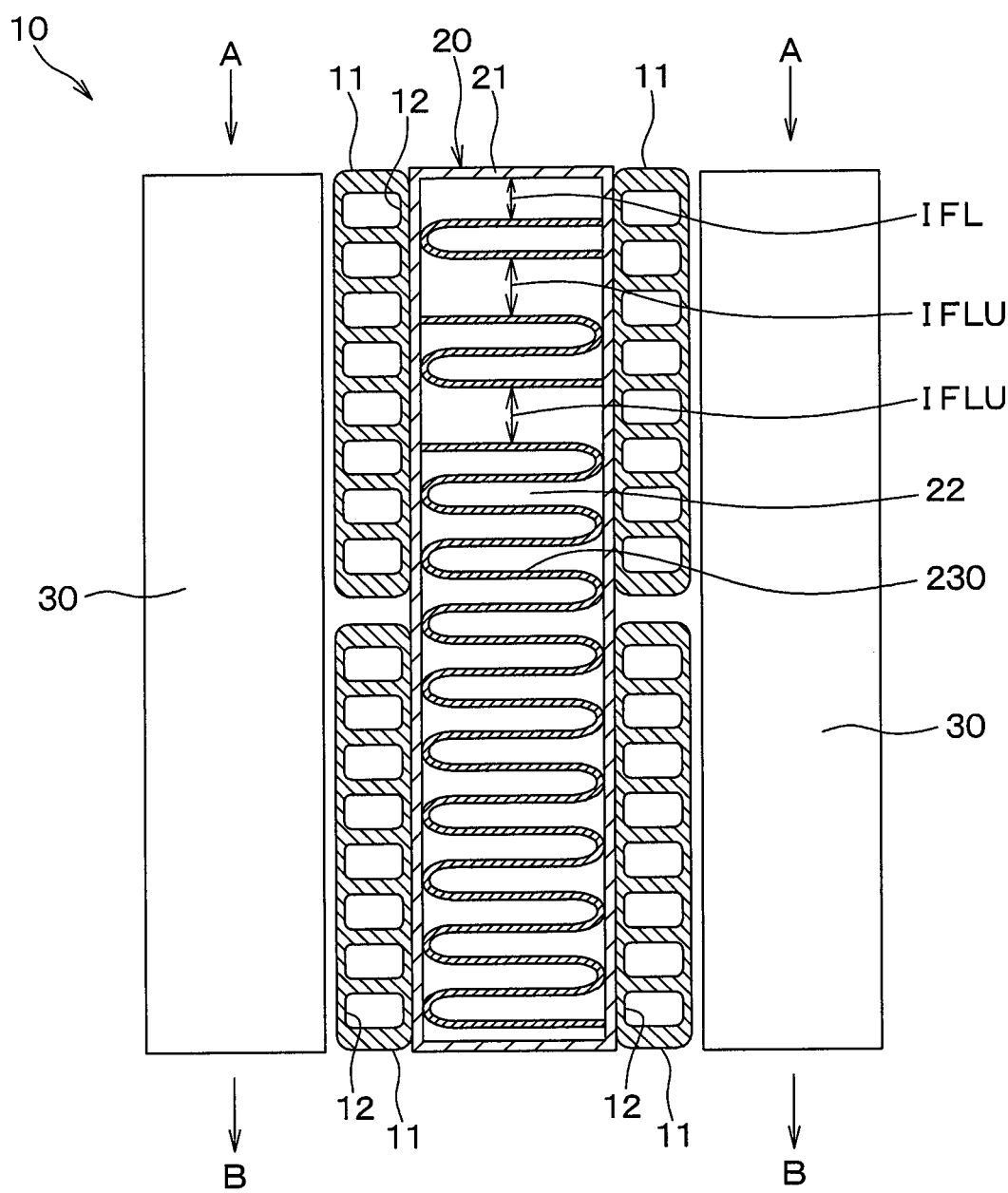
FIG. 24 is a partial cross-sectional view illustrating an evaporator according to a 14th embodiment.

The 14th embodiment is described with reference to FIG. 24. In the 14th embodiment, the inner finless area IFL where no inner fin 230 is formed is defined inside the regenerative material case 21 at the upstream side of the inner fin 230. Moreover, one or more upstream side inner finless areas IFLU are formed in the part of the inner fin 230 located in the upstream side. In FIG. 24, the both-end arrow IFL represents the range of the inner finless area IFL, and the both-end arrow IFLU represents the range of the upstream side inner finless area IFLU. Therefore, a part of the inner fin 230 located in the upstream side is intermittently provided. In contrast, the finless area is not formed in a part of the inner fin 230 located in the downstream side. Therefore, the total area of the inner fin 230 located in the upstream side is smaller than the total area of the inner fin 230 located in the downstream side.

In the 14th embodiment, the thermal resistance between the regenerative material 22 and the regenerative material case 21 in an area where the inner finless area IFL, IFLU is formed becomes larger than the thermal resistance between the regenerative material 22 and the regenerative material case 21 in an area where the inner fin 230 is arranged. Therefore, the thermal resistance between the air which flows through the air passage on the upstream side and the regenerative material 22 becomes larger than the thermal resistance between the air which flows through the air passage on the downstream side and the regenerative material 22. Therefore, the 14th embodiment can also generate the same action and effect as the first to 13th embodiments.

In the inner fin 230 of the 14th embodiment, the fin pitch of the downstream side inner fin may be set finer than the fin pitch of the upstream side inner fin.

15th Embodiment

Figure 25:
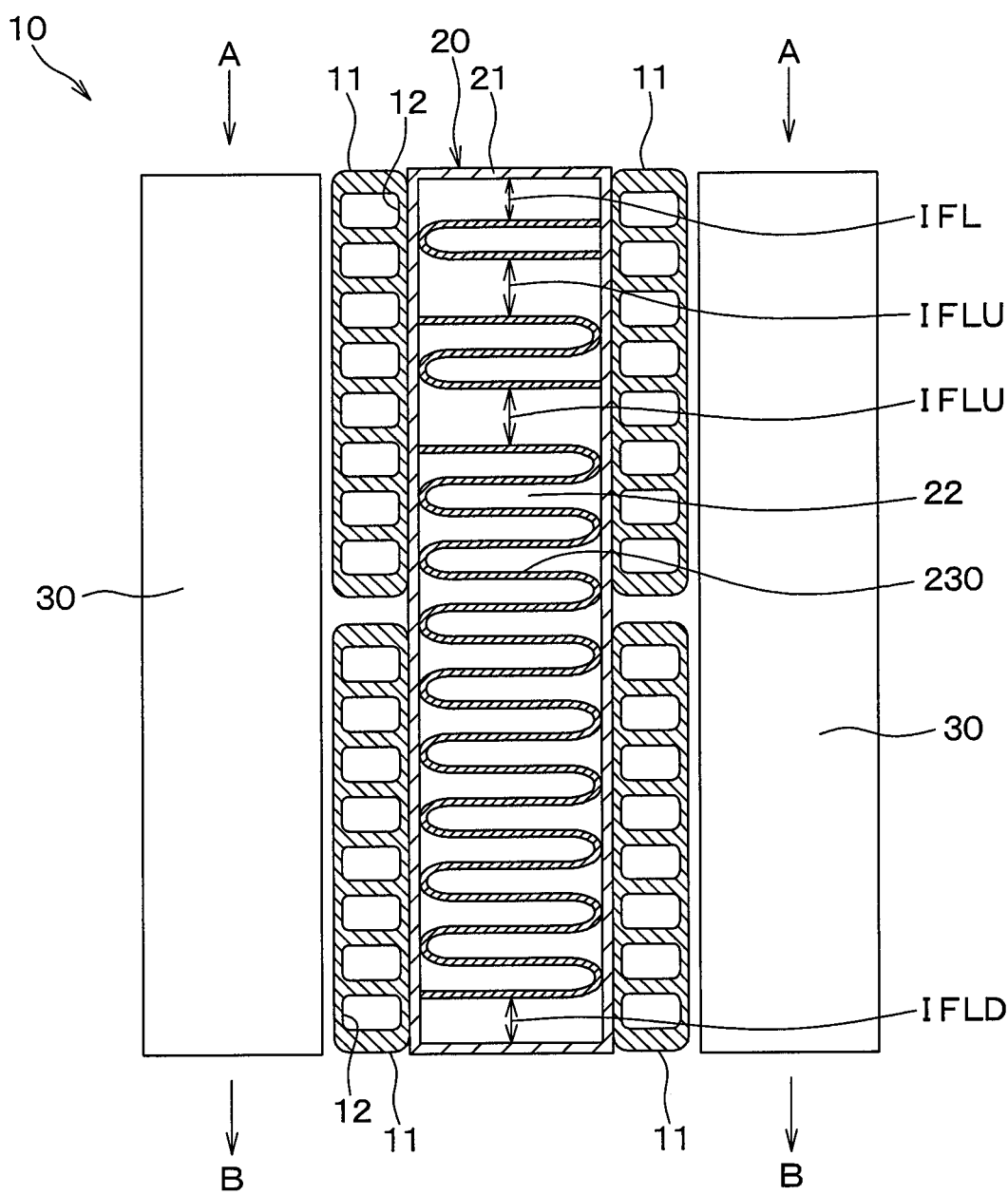
FIG. 25 is a partial cross-sectional view illustrating an evaporator according to a 15th embodiment.

The 15th embodiment is described with reference to FIG. 25. In the 15th embodiment, in addition to the inner finless area IFL and the upstream side inner finless area IFLU, one or more downstream side inner finless areas IFLD are formed in a part of the inner fin 230 located in the downstream side. In FIG. 25, the both-end arrow IFLD represents the range of the downstream side inner finless area IFLD. That is, in the 15th embodiment, one or more upstream side inner finless areas IFLU are formed in a part of the inner fin 230 located in the upstream side. Moreover, one or more downstream side inner finless areas IFLD are formed in a part of the inner fin 230 located in the downstream side.

Here, the space volume which is the sum of the one or more upstream side inner finless areas IFLU is larger than the space volume which is the sum of the one or more downstream side inner finless areas IFLD. Therefore, the thermal resistance between the air which flows through the air passage on the upstream side and the regenerative material 22 becomes larger than the thermal resistance between the air which flows through the air passage on the downstream side and the regenerative material 22. Therefore, the 15th embodiment can also generate the same action and effect as the first to 14th embodiments.

In the inner fin 230 of the 15th embodiment, the fin pitch of the downstream side inner fin may be set finer than the fin pitch of the upstream side inner fin.

16th Embodiment

Figure 26:
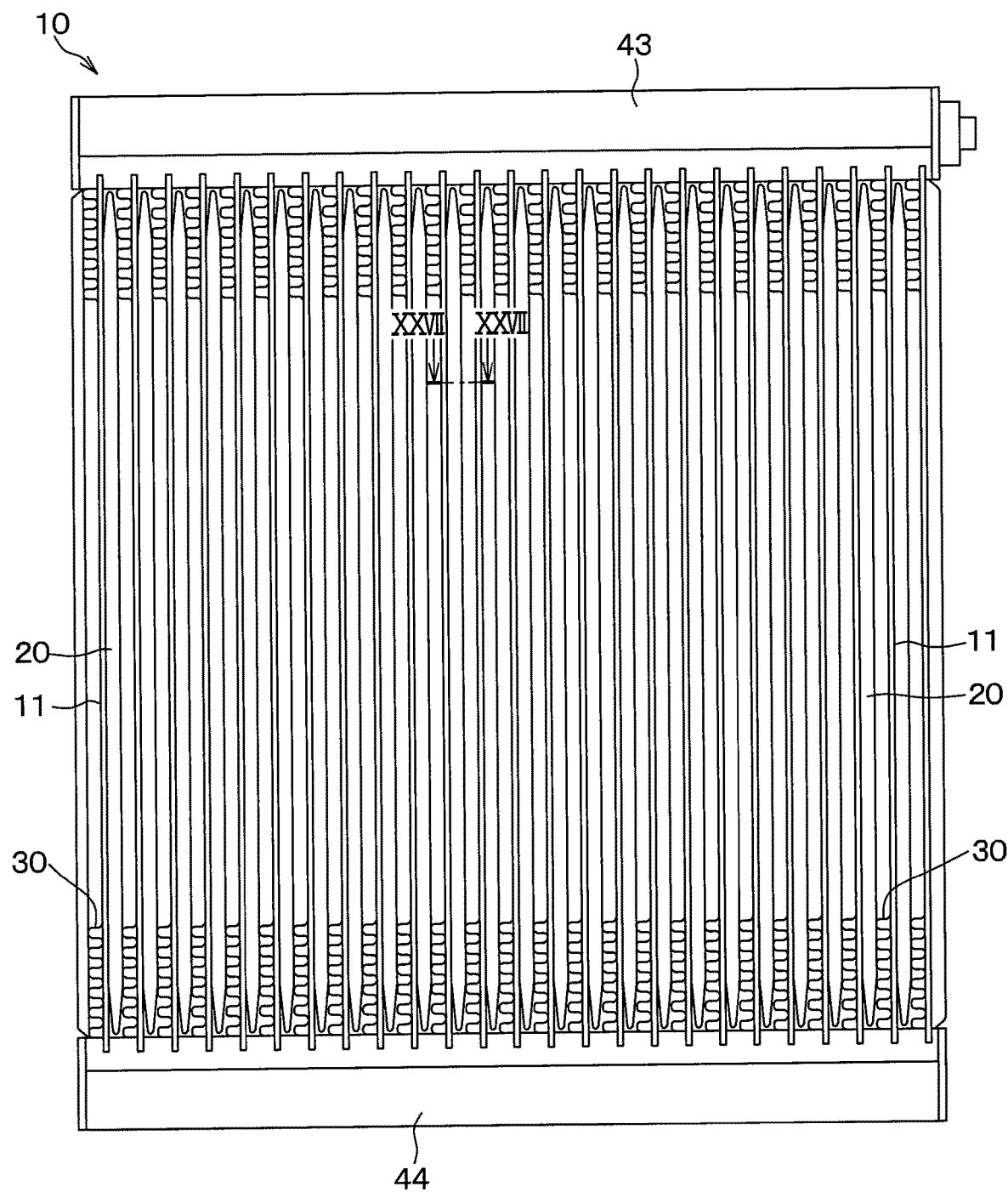
FIG. 26 is a plan view illustrating an evaporator according to a 16th embodiment.
Figure 27:
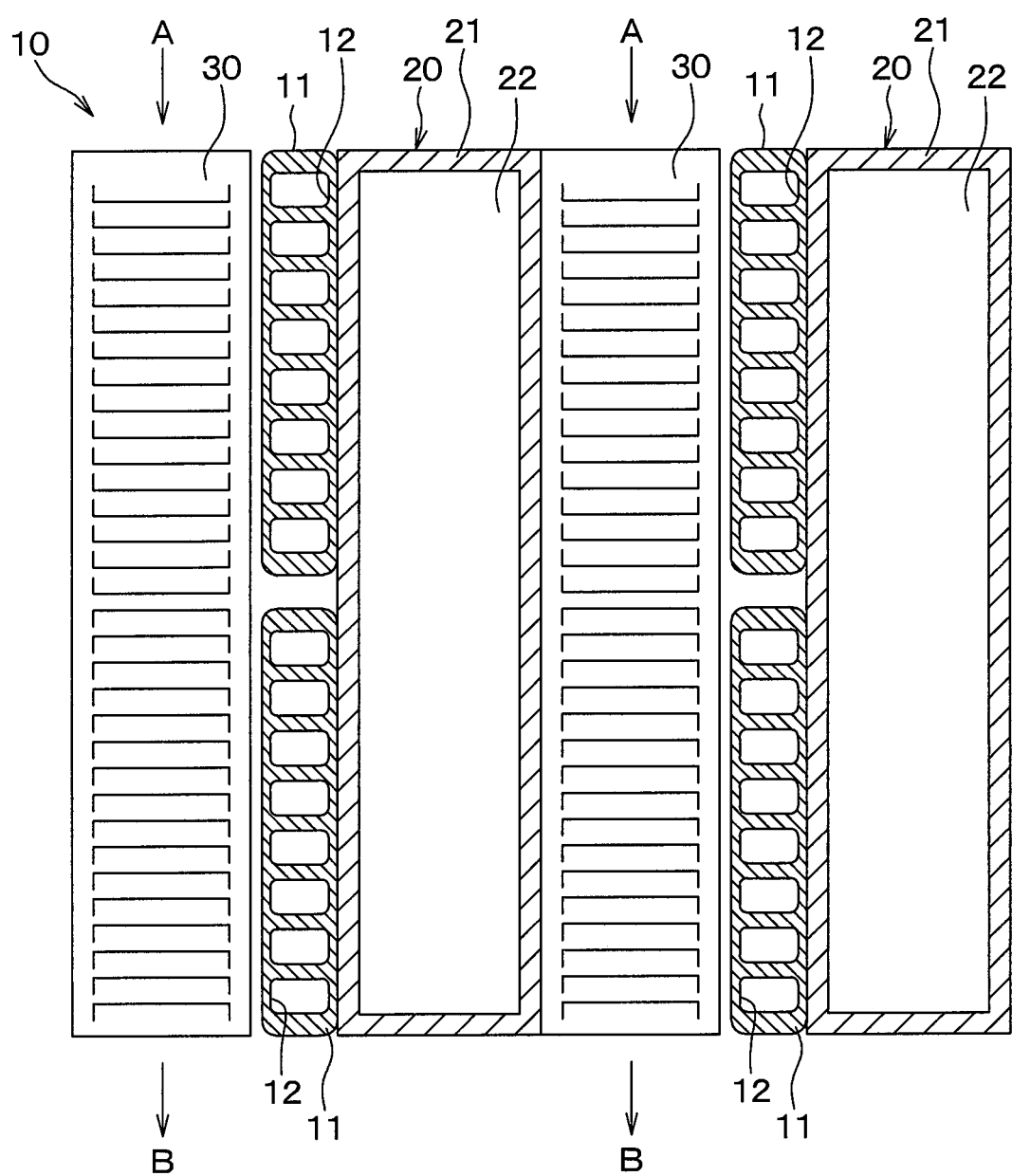
FIG. 27 is a partial cross-sectional view taken along a line XXVII-XXVII of FIG. 26.

The 16th embodiment is described with reference to FIG. 26 and FIG. 27. In FIG. 26, the illustration of the air passage fin 30 is partially omitted. The 16th to 18th embodiments illustrate a configuration in which the regenerator 20 and the air passage fin 30 are connected directly with each other.

In the 16th embodiment, the refrigerant pipe 11, the regenerator 20, the air passage fin 30, the refrigerant pipe 11, the regenerator 20, and the air passage fin 30 . . . are arranged in this order in a direction intersecting the flow direction of air. By this arrangement, the regenerator 20 and the air passage fin 30 are connected directly with each other. In addition, the arrangement of the air passage fin 30, the refrigerant pipe 11, and the regenerator 20 is not limited to this, and can be set arbitrarily. The 16th embodiment can also generate the same action and effect as the first to 15th embodiments.

17th Embodiment

Figure 28:
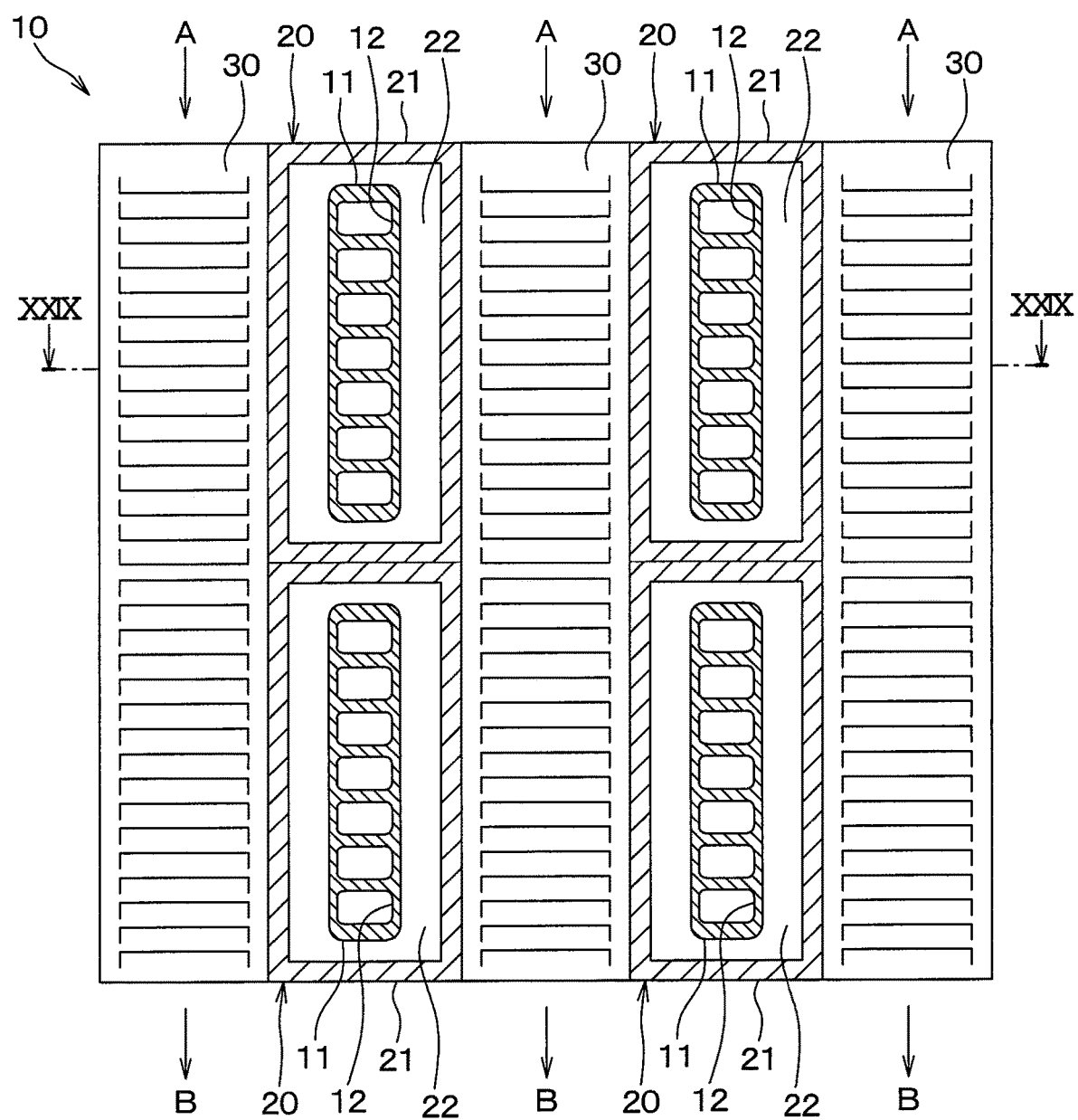
FIG. 28 is a partial cross-sectional view illustrating an evaporator according to a 17th embodiment.
Figure 29:
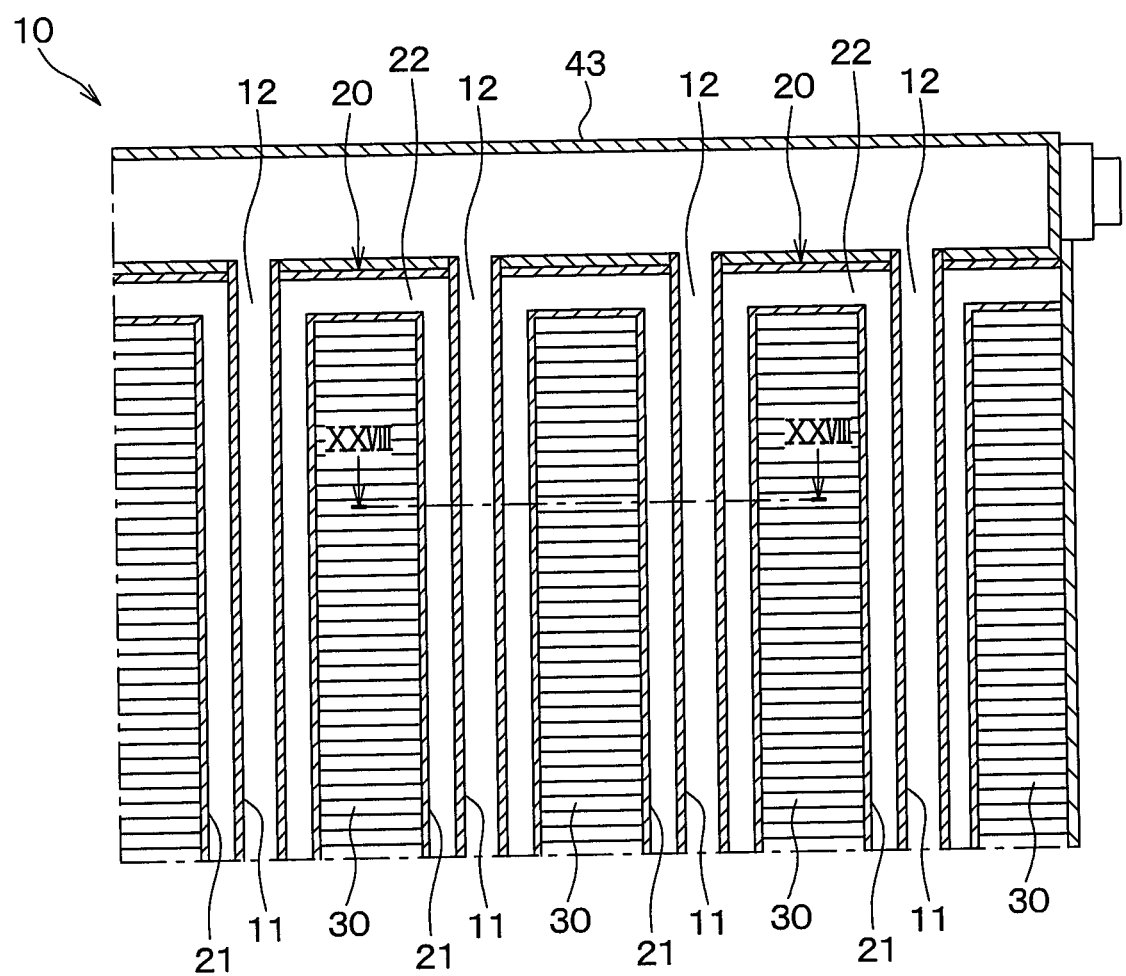
FIG. 29 is a partial cross-sectional view taken along a line XXIX-XXIX of FIG. 28.

The 17th embodiment is described with reference to FIG. 28 and FIG. 29. In the 17th embodiment, the refrigerant pipe 11 is formed at an intermediate position inside the regenerator 20. Moreover, as shown in FIG. 29, the regenerator 20 is formed in a part of the first to fourth header tanks 41-44 adjacent to the air passage fin 30. By this configuration, the regenerator 20 and the air passage fin 30 are connected directly with each other. The 17th embodiment can also generate the same action and effect as the first to 16th embodiments. Furthermore, the amount of the regenerative material 22 can be increased in the 17th embodiment.

18th Embodiment

Figure 30:
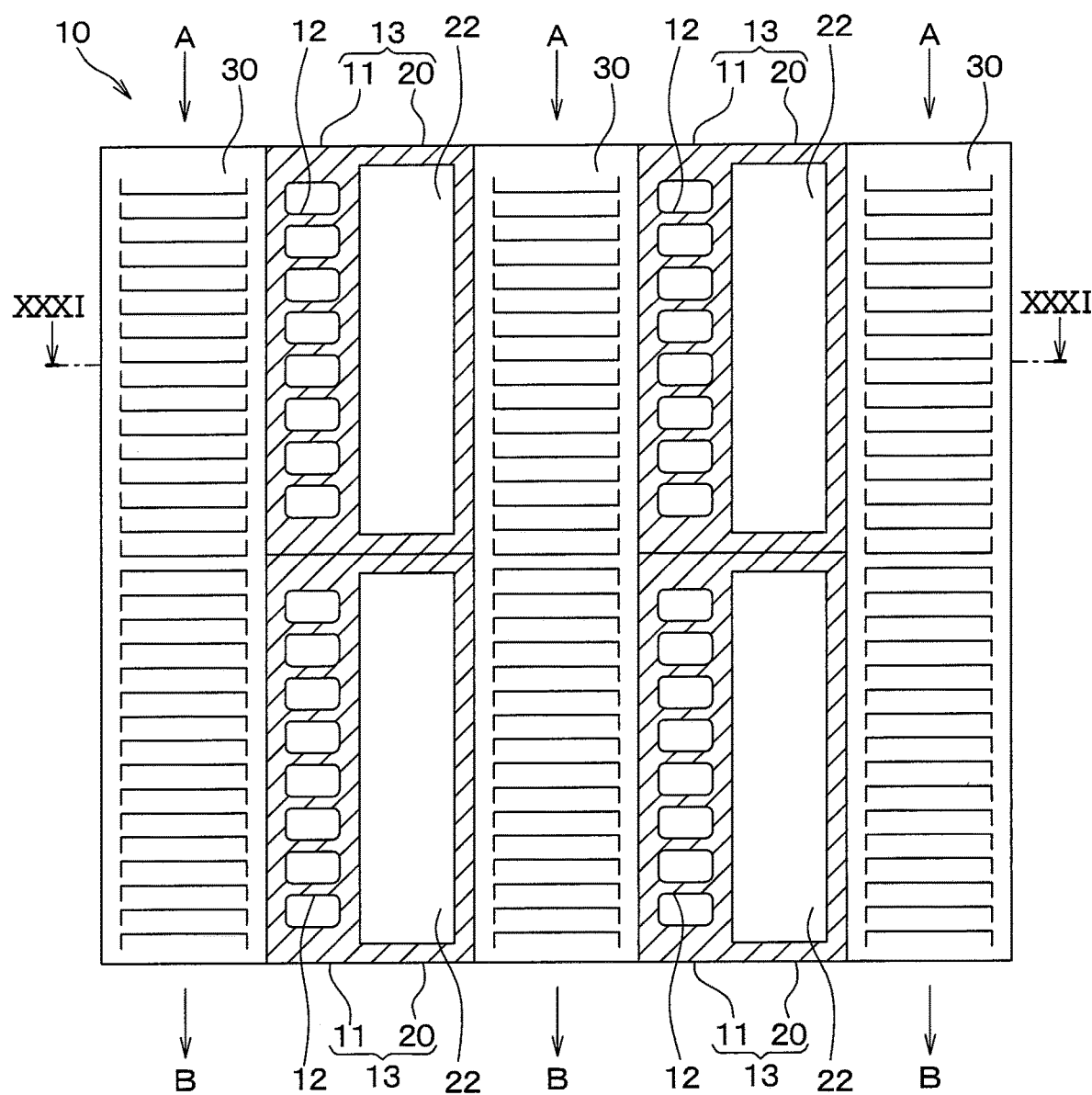
FIG. 30 is a partial cross-sectional view illustrating an evaporator according to an 18th embodiment.
Figure 31:
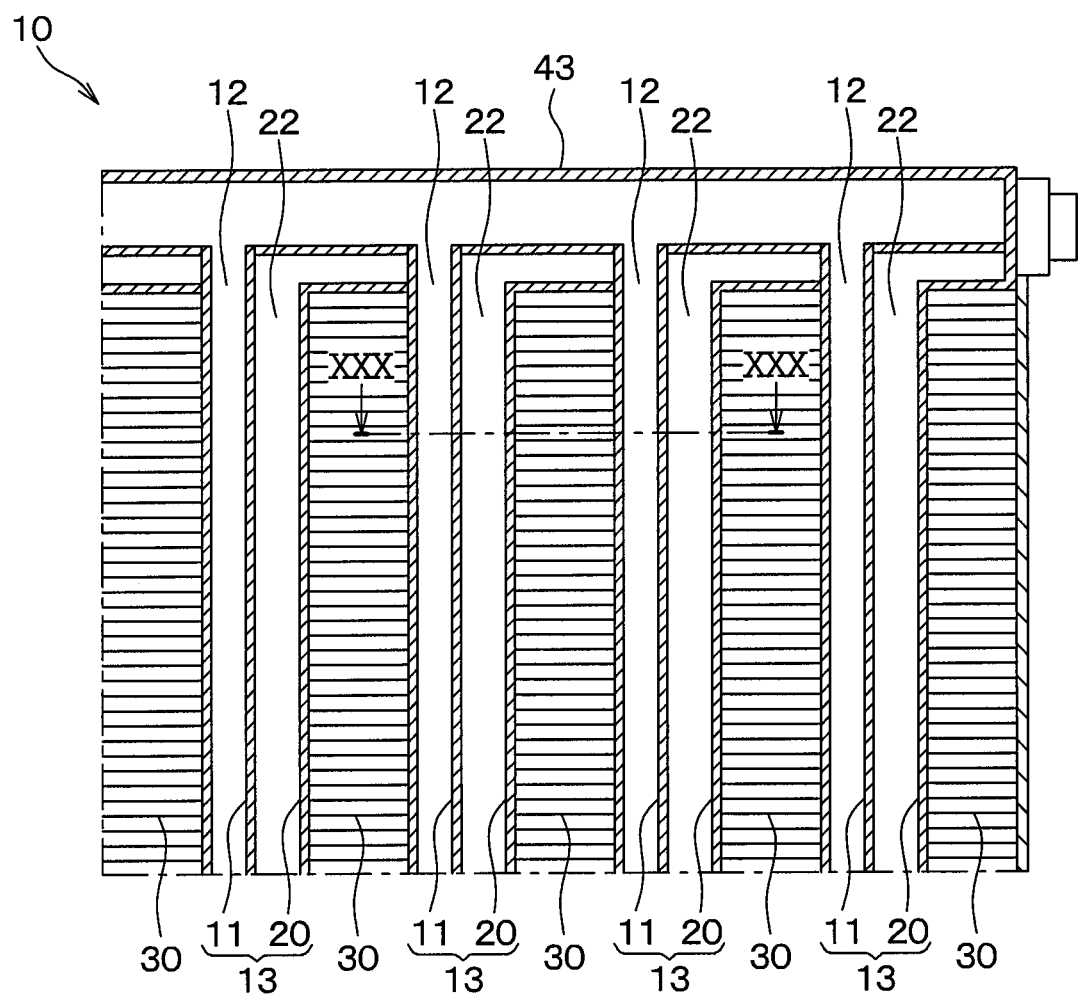
FIG. 31 is a partial cross-sectional view taken along a line XXXI-XXXI of FIG. 30.

The 18th embodiment is described with reference to FIG. 30 and FIG. 31. In the 18th embodiment, the refrigerant pipe 11 and the regenerator 20 are integrally formed by the same case 13. A refrigerant flows in the refrigerant passage 12 formed in the case 13, and the regenerative material 22 is enclosed in a regenerative material enclosure portion. As shown in FIG. 31, the regenerator 20 is formed also in a part of the first to fourth header tanks 41-44 adjacent to the air passage fin 30. Thereby, the regenerator 20 and the air passage fin 30 are connected directly with each other, and also the refrigerant pipe 11 and the air passage fin 30 are connected directly with each other. The 18th embodiment can also generate the same action and effect as the first to 17th embodiments. Furthermore, the refrigerant pipe 11 and the regenerator 20 can be configured with simple structure, and the amount of the regenerative material 22 can be increased without reducing the air resistance, in the 18th embodiment.

Other Embodiment

It should be appreciated that the present disclosure is not limited to the embodiments described above and can be modified appropriately within the scope of the appended claims. The embodiments above are not irrelevant to one another and can be combined appropriately unless a combination is obviously impossible. In the respective embodiments above, it goes without saying that elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to shapes and positional relations, the components are not limited to the shapes and the positional relations unless explicitly specified or limited to particular shapes and positional relations in principle.

In the above-mentioned embodiment, the permissive temperature by which an occupant can feel low temperature is explained as 15° C. In the other embodiment, the permissive temperature is not limited and can be suitably set according to the vehicle type, environment or equipment to which the refrigerating cycle device is applied.

In the above-mentioned embodiment, the regenerative material including paraffine or hydrate is used, which has the melting point of about 3-10° C. In the other embodiment, the material or the melting point of the regenerative material is not limited and can be suitably set according to the vehicle type, environment or equipment to which the refrigerating cycle device is applied.

The air passage fin includes the upstream side outer fin and the downstream side outer fin in the above-mentioned embodiment. In the other embodiment, the air passage fin may have a third outer fin, in addition to the upstream side outer fin and the downstream side outer fin. Moreover, the inner fin may have a third inner fin in addition to the upstream side inner fin and the downstream side inner fin.

In the above-mentioned embodiment, each of the air passage fin and the inner fin is the corrugated fin or the offset fin. In the other embodiment, each of the air passage fin and the inner fin may be the other various fin, such as a wavy fin or a louver fin.

The air passage fin and the inner fin may have a flat shape not equipped with the louvers. Furthermore, the fin is omissible. Such a heat exchanger is called as a finless type. The fin may be replaced with a projection part projected from a refrigerant pipe to facilitate heat exchange with air.

In the other embodiment, the refrigerant pipe may have other shape, such as a multi-hole extrusion pipe or a pipe formed by bending a board material with dimples into a pipe shape.

In the above-mentioned embodiment, the flow course of the refrigerant in the evaporator is explained as a right-and-left U-turn type. In the other embodiment, the refrigerant may have the other flow course such as a one-way type and a front-and-rear U-turn type.

In the above-mentioned embodiment, the evaporator used for a refrigerating cycle device of a vehicle is explained. In the other embodiment, the evaporator may be applied to other refrigerating cycle device, such as for freezing, for heating, and for hot-water supply.

CONCLUSION

According to the first viewpoint represented by a part or all of the embodiments, a regenerative heat exchanger includes a refrigerant pipe, a regenerator, and an air passage fin. The refrigerant pipe has a refrigerant passage through which a refrigerant flows. The regenerator has a regenerative material which carries out heat exchange with the refrigerant flowing through the refrigerant pipe to store the regenerative heat of the refrigerant, and a regenerative material case housing the regenerative material. The air passage fin is disposed in the air passage formed outside of the refrigerant pipe and the regenerator, and is thermally connected with the regenerator directly or through the refrigerant pipe. At least one of the regenerator or the air passage fin is configured so that the thermal resistance between the regenerative material located in the upstream side and the air which flows through the air passage becomes larger than the thermal resistance between the regenerative material located in the downstream side and the air which flows through the air passage.

According to the second viewpoint, the regenerative heat exchanger is configured so that the thermal resistance between a part of the air passage fin located in the upstream side and the air which flows through the air passage becomes larger than the thermal resistance between a part of the air passage fin located in the downstream side and the air which flows through the air passage.

Accordingly, the thermal resistance between the regenerative material located in the upstream side and the air which flows through the air passage can be made larger than the thermal resistance between the regenerative material located in the downstream side and the air which flows through the air passage. Therefore, the melting start time of the regenerative material located in the upstream side can be made late, and approaches the melting start time of the regenerative material located in the downstream side. Thus, the regenerative material can start melting at the same time on the whole. Therefore, the regenerative heat exchanger can delay both the melting finish time of the regenerative material located in the upstream side and the melting finish time of the regenerative material located in the downstream side.

According to the third viewpoint, the pitch of a part of the air passage fin located in the upstream side is larger than the pitch of a part of the air passage fin located in the downstream side.

Accordingly, the thermal resistance between the part of the air passage fin located in the upstream side and the air which flows through the air passage can be made larger than the thermal resistance between the part of the air passage fin located in the downstream side and the air which flows through the air passage.

According to the 4th viewpoint, a total area of a part of the air passage fin located upstream in an air flow direction of the air passage is smaller than a total area of a part of the air passage fin located downstream in the air flow direction of the air passage.

Accordingly, the thermal resistance between the part of the air passage fin located in the upstream side and the air which flows through the air passage can be made larger than the thermal resistance between the part of the air passage fin located in the downstream side and the air which flows through the air passage.

According to the 5th viewpoint, the air passage defined outside of the refrigerant pipe and the regenerator has a finless area, in which no air passage fin is arranged, on an upstream side of the air passage fin in an air flow direction.

Accordingly, the thermal resistance between the regenerative material located in the upstream side and the air which flows through the air passage can be made larger than the thermal resistance between the regenerative material located in the downstream side and the air which flows through the air passage.

According to the 6th viewpoint, a part of the air passage fin located on an upstream side in the air flow direction of the air passage has one or a plurality of upstream side finless area.

Accordingly, the thermal resistance between the regenerative material located in the upstream side and the air which flows through the air passage can be made larger than the thermal resistance between the regenerative material located in the downstream side and the air which flows through the air passage.

According to the 7th viewpoint, the part of the air passage fin located on a downstream side in the air flow direction of the air passage has one or a plurality of downstream side finless area. A space volume which is a sum of the one or a plurality of upstream side finless area is larger than a space volume which is a sum of the one or a plurality of downstream side finless area.

Accordingly, the thermal resistance between the regenerative material located in the upstream side and the air which flows through the air passage can be made larger than the thermal resistance between the regenerative material located in the downstream side and the air which flows through the air passage.

According to the 8th viewpoint, the air passage fin is configured such that an area of louvers defined in a part located on an upstream side in an air flow direction of the air passage is smaller than an area of louvers defined in a part located on a downstream side in the air flow direction of the air passage.

Accordingly, the thermal resistance between the louver on the air passage fin in the upstream side and the air which flows through the air passage can be made larger than the thermal resistance between the louver on the air passage fin in the downstream side and the air which flows through the air passage.

According to the 9th viewpoint, the regenerator further has an inner fin inside the regenerative material case.

At least one of the regenerative material case or the inner fin is configured so that the thermal resistance between the part located in the upstream side and the air which flows through the air passage becomes larger than the thermal resistance between the part located in the downstream side and the air which flows through the air passage.

Accordingly, the melting start time of the regenerative material located in the upstream side becomes late and approaches the melting start time of the regenerative material located in the downstream side. Therefore, the regenerative material can begin melting at the same time on the whole. Therefore, the regenerative heat exchanger can delay both the melting finish time of the regenerative material located in the upstream side and the melting finish time of the regenerative material located in the downstream side.

According to the 10th viewpoint, a pitch of the inner fin in the part located on the upstream side in the air flow direction of the air passage is larger than a pitch of the inner fin in the part located on the downstream side in the air flow direction of the air passage.

Accordingly, the thermal resistance between the part of the inner fin located in the upstream side and the regenerative material located in the upstream side can be made larger than the thermal resistance between the part of the inner fin located in the downstream side and the regenerative material located in the downstream side.

According to the 11th viewpoint, the inner fin is configured to have a pitch that gradually becomes narrower as extending from the part located on the upstream side in the air flow direction of the air passage to the part located on the downstream side in the air flow direction of the air passage.

Accordingly, the melting start time or the melting finish time of the regenerative material can be made the same and optimized from the upstream side to the downstream side.

According to the 12th viewpoint, the inner fin is configured such that a thickness in the part located on the upstream side in the air flow direction of the air passage is thinner than a thickness in the part located on the downstream side in the air flow direction of the air passage.

Accordingly, the fin efficiency of the part of the inner fin located in the upstream side becomes lower than the fin efficiency of the part of the inner fin located in the downstream side. Therefore, the thermal resistance between the part of the inner fin and the regenerative material located in the upstream side can be made larger than the thermal resistance between the part of the inner fin and the regenerative material located in the downstream side.

According to the 13th viewpoint, an inner finless area in which no inner fin is arranged is defined in the regenerative material case and is located upstream of the inner fin in the air flow direction.

Accordingly, the thermal resistance between the regenerative material located in the upstream side and the air which flows through the air passage can be made larger than the thermal resistance between the regenerative material located in the downstream side and the air which flows through the air passage.

According to the 14th viewpoint, a part of the inner fin located on an upstream side in the air flow direction of the air passage has one or a plurality of upstream side inner finless area.

Accordingly, the thermal resistance between the regenerative material located in the upstream side and the air which flows through the air passage can be made larger than the thermal resistance between the regenerative material located in the downstream side and the air which flows through the air passage.

According to the 15th viewpoint, a part of the inner fin located on a downstream side in the air flow direction of the air passage has one or a plurality of downstream side inner finless area. A space volume which is a sum of the one or a plurality of upstream side inner finless area is larger than a space volume which is a sum of the one or a plurality of downstream side inner finless area.

Accordingly, the thermal resistance between the regenerative material located in the upstream side and the air which flows through the air passage can be made larger than the thermal resistance between the regenerative material located in the downstream side and the air which flows through the air passage.

According to the 16th viewpoint, the regenerative material case has an external part that defines an external shape of the regenerative material case, and a plurality of partition parts that partitions an inner space of the external part. The plurality of partition parts is configured such that a thermal resistance between the regenerative material located on an upstream side in an air flow direction of the air passage and air flowing through the air passage is larger than a thermal resistance between the regenerative material located on a downstream side in the air flow direction of the air passage and air flowing through the air passage.

Accordingly, the melting start time of the regenerative material located in the upstream side becomes late and approaches the melting start time of the regenerative material located in the downstream side. Therefore, the regenerative material begins melting at the same timing, on the whole. Therefore, the regenerative heat exchanger can delay both the melting finish time of the regenerative material located in the upstream side and the melting finish time of the regenerative material located in the downstream side.

According to the 17th viewpoint, a pitch of a part of the plurality of partition parts located on the upstream side in the air flow direction of the air passage is larger than a pitch of a part of the plurality of partition parts located on the downstream side in the air flow direction of the air passage.

Accordingly, the thermal resistance between the part of the plural partition parts and the regenerative material located in the upstream side can be made larger than the thermal resistance between the part of the plural partition parts and the regenerative material located in the downstream side.

According to the 18th viewpoint, a total area of a part of the plurality of partition parts located on the upstream side in the air flow direction of the air passage is smaller than a total area of a part of the plurality of partition parts located on the downstream side in the air flow direction of the air passage.

Accordingly, the thermal resistance between the part of the plural partition parts and the regenerative material located in the upstream side can be made smaller than the thermal resistance between the part of the plural partition parts and the regenerative material located in the downstream side.

What is claimed is:

1. A regenerative heat exchanger comprising:
   a refrigerant pipe including a refrigerant passage through which refrigerant flows;
   a regenerator including a regenerative material that stores regenerative heat by exchanging heat with the refrigerant flowing through the refrigerant pipe, and a regenerative material case housing the regenerative material; and
   an air passage fin disposed in an air passage defined outside of the refrigerant pipe and the regenerator, the air passage fin being thermally connected with the regenerator directly or through the refrigerant pipe, wherein
   at least one of the regenerator and the air passage fin is configured such that a thermal resistance between the regenerative material located on an upstream in an air flow direction of the air passage and air flowing through the air passage is larger than a thermal resistance between the regenerative material located on a downstream in the air flow direction of the air passage and air flowing through the air passage,
   the regenerator further has an inner fin disposed in the regenerative material case,
   at least one of the regenerative material case and the inner fin is configured such that a thermal resistance between a part located on an upstream side in the air flow direction of the air passage and air flowing through the air passage is larger than a thermal resistance between a part located on a downstream side in the air flow direction of the air passage and air flowing through the air passage, and
   a pitch of the inner fin located on the upstream side in the air flow direction of the air passage is larger than a pitch of the inner fin located on the downstream side in the air flow direction of the air passage.

2. The regenerative heat exchanger according to claim 1, wherein
   the air passage fin is configured such that a thermal resistance between a part of the air passage fin located on the upstream side in the air flow direction of the air passage and air flowing through the air passage is larger than a thermal resistance between a part of the air passage fin located on the downstream side in the air flow direction of the air passage and air flowing through the air passage.

3. The regenerative heat exchanger according to claim 1, wherein
   a pitch of a part of the air passage fin located on the upstream side in the air flow direction of the air passage is larger than a pitch of a part of the air passage fin located on the downstream side in the air flow direction of the air passage.

4. The regenerative heat exchanger according to claim 1, wherein a total area of a part of the air passage fin located on the upstream side in the air flow direction of the air passage is smaller than a total area of a part of the air passage fin located on the downstream side in the air flow direction of the air passage.

5. The regenerative heat exchanger according to claim 1, wherein the air passage defined outside of the refrigerant pipe and the regenerator has a finless area in which no air passage fin is arranged on an upstream side of the air passage fin in the air flow direction.

6. The regenerative heat exchanger according to claim 1, wherein a part of the air passage fin located on the upstream side in the air flow direction of the air passage has one or a plurality of upstream side finless area.

7. The regenerative heat exchanger according to claim 6, wherein
   a part of the air passage fin located on the downstream side in the air flow direction of the air passage has one or a plurality of downstream side finless area, and
   a space volume which is a sum of the one or a plurality of upstream side finless area is larger than a space volume which is a sum of the one or a plurality of downstream side finless area.

8. The regenerative heat exchanger according to claim 1, wherein the air passage fin is configured such that an area of louvers defined in a part of the air passage fin located on the upstream side in the air flow direction of the air passage is smaller than an area of louvers defined in a part of the air passage fin located on the downstream side in the air flow direction of the air passage.

9. The regenerative heat exchanger according to claim 1, wherein
   the inner fin is configured to have a pitch that gradually becomes narrower as extending from the part located on the upstream side in the air flow direction of the air passage to the part located on the downstream side in the air flow direction of the air passage.

10. The regenerative heat exchanger according to claim 1, wherein an inner finless area in which no inner fin is arranged is defined in the regenerative material case and is located upstream of the inner fin in the air flow direction.

11. The regenerative heat exchanger according to claim 1, wherein a part of the inner fin located on the upstream side in the air flow direction of the air passage has one or a plurality of upstream side inner finless area.

12. The regenerative heat exchanger according to claim 1, wherein the regenerative material case has an external part that defines an external shape of the regenerative material case, and a plurality of partition parts that partitions an inner space of the external part, and
the plurality of partition parts is configured such that a thermal resistance between the regenerative material located on the upstream side in the air flow direction of the air passage and air flowing through the air passage is larger than a thermal resistance between the regenerative material located on the downstream side in the air flow direction of the air passage and air flowing through the air passage.

13. A regenerative heat exchanger comprising:
a refrigerant pipe including a refrigerant passage through which refrigerant flows;
a regenerator including a regenerative material that stores regenerative heat by exchanging heat with the refrigerant flowing through the refrigerant pipe, and a regenerative material case housing the regenerative material; and
an air passage fin disposed in an air passage defined outside of the refrigerant pipe and the regenerator, the air passage fin being thermally connected with the regenerator directly or through the refrigerant pipe, wherein
at least one of the regenerator and the air passage fin is configured such that a thermal resistance between the regenerative material located on an upstream in an air flow direction of the air passage and air flowing through the air passage is larger than a thermal resistance between the regenerative material located on a downstream in the air flow direction of the air passage and air flowing through the air passage,
the regenerator further has an inner fin disposed in the regenerative material case,
at least one of the regenerative material case and the inner fin is configured such that a thermal resistance between a part located on an upstream side in the air flow direction of the air passage and air flowing through the air passage is larger than a thermal resistance between a part located on a downstream side in the air flow direction of the air passage and air flowing through the air passage, and
the inner fin is configured such that a thickness in a part located on the upstream side in the air flow direction of the air passage is thinner than a thickness in a part located on the downstream side in the air flow direction of the air passage.

14. A regenerative heat exchanger comprising:
a refrigerant pipe including a refrigerant passage through which refrigerant flows;
a regenerator including a regenerative material that stores regenerative heat by exchanging heat with the refrigerant flowing through the refrigerant pipe, and a regenerative material case housing the regenerative material; and
an air passage fin disposed in an air passage defined outside of the refrigerant pipe and the regenerator, the air passage fin being thermally connected with the regenerator directly or through the refrigerant pipe, wherein
at least one of the regenerator and the air passage fin is configured such that a thermal resistance between the regenerative material located on an upstream in an air flow direction of the air passage and air flowing through the air passage is larger than a thermal resistance between the regenerative material located on a downstream in the air flow direction of the air passage and air flowing through the air passage,
the regenerator further has an inner fin disposed in the regenerative material case,
at least one of the regenerative material case and the inner fin is configured such that a thermal resistance between a part located on an upstream side in the air flow direction of the air passage and air flowing through the air passage is larger than a thermal resistance between a part located on a downstream side in the air flow direction of the air passage and air flowing through the air passage,
a part of the inner fin located on the upstream side in the air flow direction of the air passage has one or a plurality of upstream side inner finless area,
a part of the inner fin located on the downstream side in the air flow direction of the air passage has one or a plurality of downstream side inner finless area, and
a space volume which is a sum of the one or a plurality of upstream side inner finless area is larger than a space volume which is a sum of the one or a plurality of downstream side inner finless area.

15. A regenerative heat exchanger comprising:
a refrigerant pipe including a refrigerant passage through which refrigerant flows;
a regenerator including a regenerative material that stores regenerative heat by exchanging heat with the refrigerant flowing through the refrigerant pipe, and a regenerative material case housing the regenerative material; and
an air passage fin disposed in an air passage defined outside of the refrigerant pipe and the regenerator, the air passage fin being thermally connected with the regenerator directly or through the refrigerant pipe, wherein
at least one of the regenerator and the air passage fin is configured such that a thermal resistance between the regenerative material located on an upstream in an air flow direction of the air passage and air flowing through the air passage is larger than a thermal resistance between the regenerative material located on a downstream in the air flow direction of the air passage and air flowing through the air passage,
the regenerative material case has an external part that defines an external shape of the regenerative material case, and a plurality of partition parts that partitions an inner space of the external part,
the plurality of partition parts is configured such that a thermal resistance between the regenerative material located on an upstream side in the air flow direction of the air passage and air flowing through the air passage is larger than a thermal resistance between the regenerative material located on a downstream side in the air flow direction of the air passage and air flowing through the air passage, and
a pitch of a part of the plurality of partition parts located on the upstream side in the air flow direction of the air passage is larger than a pitch of a part of the plurality of partition parts located on the downstream side in the air flow direction of the air passage.

16. A regenerative heat exchanger comprising:
a refrigerant pipe including a refrigerant passage through which refrigerant flows;
a regenerator including a regenerative material that stores regenerative heat by exchanging heat with the refrigerant flowing through the refrigerant pipe, and a regenerative material case housing the regenerative material; and
an air passage fin disposed in an air passage defined outside of the refrigerant pipe and the regenerator, the air passage fin being thermally connected with the regenerator directly or through the refrigerant pipe, wherein
at least one of the regenerator and the air passage fin is configured such that a thermal resistance between the regenerative material located on an upstream in an air flow direction of the air passage and air flowing through the air passage is larger than a thermal resistance between the regenerative material located on a downstream in the air flow direction of the air passage and air flowing through the air passage,
the regenerative material case has an external part that defines an external shape of the regenerative material case, and a plurality of partition parts that partitions an inner space of the external part,
the plurality of partition parts is configured such that a thermal resistance between the regenerative material located on an upstream side in the air flow direction of the air passage and air flowing through the air passage is larger than a thermal resistance between the regenerative material located on a downstream side in the air flow direction of the air passage and air flowing through the air passage, and
a total area of a part of the plurality of partition parts located on the upstream side in the air flow direction of the air passage is smaller than a total area of a part of the plurality of partition parts located on the downstream side in the air flow direction of the air passage.

* * * * *